(12) United States Patent
Zhu

(10) Patent No.: US 7,170,515 B1
(45) Date of Patent: Jan. 30, 2007

(54) RENDERING PIPELINE

(75) Inventor: Ming B. Zhu, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 250 days.

(21) Appl. No.: 10/729,874

(22) Filed: Dec. 5, 2003

Related U.S. Application Data

(63) Continuation of application No. 08/978,491, filed on Nov. 25, 1997, now Pat. No. 6,697,063.

(51) Int. Cl.
*G06T 15/00* (2006.01)

(52) U.S. Cl. ............... 345/422; 345/423; 345/426

(58) Field of Classification Search ............ 345/418, 345/422, 423, 426
See application file for complete search history.

(56) References Cited

U.S. PATENT DOCUMENTS 5,886,701 A * 3/1999 Chauvin et al. ............ 345/418

* cited by examiner

*Primary Examiner*—Almis R. Jankus
(74) *Attorney, Agent, or Firm*—Townsend and Townsend and Crew LLP

(57) ABSTRACT

A rendering pipeline system for a computer environment uses screen space tiling (SST) to eliminate the memory bandwidth bottleneck due to frame buffer access and performs screen space tiling efficiently, while avoiding the breaking up of primitives. The system also reduces the buffering size required by SST. High quality, full-scene anti-aliasing is easily achieved because only the on-chip multi-sample memory corresponding to a single tile of the screen is needed. The invention uses a double-z scheme that decouples the scan conversion/depth-buffer processing from the more general rasterization and shading processing through a scan/z engine. The scan/z engine externally appears as a fragment generator but internally resolves visibility and allows the rest of the rendering pipeline to perform setup for only visible primitives and shade only visible fragments. The resulting reduced raster/shading requirements can lead to reduced hardware costs because one can process all parameters with generic parameter computing units instead of with dedicated parameter computing units. The invention processes both opaque and transparent geometries.

20 Claims, 20 Drawing Sheets

RENDERING PIPELINE

BACKGROUND OF THE INVENTION

1. Technical Field

The invention relates to the rendering of graphics in a computer environment. More particularly, the invention relates to a rendering pipeline system that renders graphical primitives displayed in a computer environment.

2. Description of the Prior Art

Graphical representations and user interfaces are no longer an optional feature but rather a requirement for computer applications. There is a pressing need to produce high performance, high quality, and low cost 3D graphics rendering pipelines because of this demand.

Some geometry processing units (e.g. general-purpose host processors or specialized dedicated geometry engines) process geometries in model space into geometries in screen space. Screen space geometries are a collection of geometric primitives represented by screen space vertices and their connectivity information. A screen space vertex typically contains screen x, y, z coordinates, multiple sets of colors, and multiple sets of texture attributes (including the homogeneous components), and possibly vertex normals. Referring to FIG. 1, the connectivity information is conveyed using basic primitives such as points, lines, triangles 101, or strip 102, or fan 103 forms of these basic primitives.

In a traditional architecture, raster or rasterization refers to the following process:

Given screen x and y positions as well as all other parameter values for all vertices of a primitive, perform parameter setup computation in the form of plain equations; scan convert the primitive into fragments based on screen x and y positions; compute parameter values at these fragment locations. Referring to FIG. 2, a traditional rendering pipeline is shown. Screen geometries 201 are rasterized 202. The shading process 203 is then performed on the graphics primitives. The z/alpha blending process 204 places the final output into the color/z frame buffer 205 which is destined for the video output 206. There is a serious concern with the memory bandwidth between the z/alpha-blending/pixel-op process 204 and the frame buffer in the memory 205. To z-buffer 100 Mpixels/s, assuming 4 bytes/pixel for RGBA color, 2 bytes/pixel for z, and 50% of the pixels actually being written into the frame buffer on average due to z-buffering. The memory bandwidth is computed as follows:

100 Mpixels/s*(2 bytes+50%*(4 bytes+2 bytes))/
pixel=500 Mbytes/s

The equatation assumes a hypothetical perfect prefetch of pixels from frame buffer memory into a local pixel cache without either page miss penalty or wasteful pixels.

The actual memory bandwidth is substantially higher because the read-modify-write cycle required for z-buffering cannot be implemented efficiently without a complicated pipeline and long delay. Alpha blending increases the bandwidth requirement even further. The number is dramatically increased if full-scene anti-aliasing is performed. For example, 4-subsample multi-sampling requires the frame buffer memory access bandwidth by the z/alpha-blending/pixel-op engine 204 to roughly quadruple, i.e. at least 2 Gbytes/s of memory bandwidth is required to do 4-subsample multi-sampling at 100 Mpixels/s. Full-scene anti-aliasing is extremely desirable for improving rendering quality; however, unless either massive memory bandwidth is applied (e.g. through interleaving multiple processors/memories), which leads to rapid hardware cost increase or compromised pixel fill performance, full scene anti-aliasing is impractical to implement under a traditional rendering pipeline architecture. Full scene anti-aliasing also requires the frame buffer size to increase significantly, e.g. to quadruple in the case of 4-subsample multi-sampling.

Another drawback with the traditional rendering pipeline is that all primitives, regardless if they are visible or not, are completely rasterized and corresponding fragments are shaded. Considering a pixel fill rate of 400 Mpixels for non-anti-aliased geometries and assuming a screen resolution of 1280×1024 with a 30 Hz frame rate, the average depth complexity is 10. Even if there is anti-aliasing, the average depth complexity is still between 6~7 for an average triangle size of 50 pixels. The traditional pipeline therefore wastes a large amount of time rasterizing and shading geometries that do not contribute to final pixel colors.

There are other approaches which attempt to resolve these problems. With respect to memory bandwidth, two solutions exist. One approach is to use a more specialized memory design by either placing sophisticated logic on Dynamic Random Access Memory (DRAM) (e.g. customized memory chips such as 3DRAM) or placing a large amount of DRAM on logic. While this can alleviate the memory bandwidth problem to a large extent, it is not currently cost-effective due to the-economy-of-scale. In addition, the frame buffer size in the memory grows dramatically for full-scene anti-aliasing.

The other alternative is by caching the frame buffer on-chip, which is also called virtual buffering. Only a portion of frame buffer can be cached at any time because on-chip memory is limited. One type of virtual buffering uses the on-chip memory as a general pixel cache, i.e. a window into the frame buffer memory. Pixel caching can take advantage of spatial coherence, however, the same location of the screen might be cached in and out of the on-chip memory many times during a frame. Therefore, it uses very little intra-frame temporal coherence (in the form of depth complexity).

The only way to take advantage of intra-frame temporal coherence reliably is through screen space tiling (SST). First, by binning all geometries into tiles (also called screen subdivisions which are based on screen locations). For example, with respect to FIG. 3, the screen 301 is partitioned into 16 square, disjoint tiles, numbered 1 302, 2 303, 3 304, up to 16 312. Four triangles a 313, b 314, c 315, and d 316 are binned as follows:

tile 5 306: a 313
tile 6 307: a 313, b 314, c 315
tile 7 308: c 315, d 316
tile 9 309: a 313
tile 10 310: a 313, b 314, c 315, d 316
tile 11 311: c 315, d 316

Secondly, by sweeping through screen tiles, processing a tile's worth of geometry at a time, using an on-chip tile frame buffer, producing the final pixel colors corresponding to the tile, and outputting them to the frame buffer. Here, the external frame buffer access bandwidth is limited to the final pixel color output. There is no external memory bandwidth difference between non-anti-aliasing and full-scene anti-aliasing. The memory footprint in the external frame buffer is identical regardless if non-anti-aliasing or full-scene anti-aliasing is used. There is no external depth-buffer memory bandwidth effectively, and the depth-buffer need not exist in the external memory. The disadvantage is that extra screen space binning is introduced, which implies an extra frame of latency.

Two main approaches exist with respect to depth complexity. One requires geometries sorted from front-to-back and rendered in that order and no shading of invisible fragments.

The disadvantages to this first approach are: 1) spatial sorting needs to be performed off-line, and thus only works reliably for static scenes, dynamics dramatically reduce the effectiveness; 2) front-to-back sorting requires depth priorities to be adjusted per frame by the application programs, which places a significant burden on the host processors; and 3) front-to-back sorting tends to break other forms of coherence, such as texture access coherence or shading coherence. Without front-to-back sorting, one-pass shading-after-z for random applications gives some improvement over the traditional rendering pipeline, however, performance improvement is not assured.

The other approach is deferred shading where: 1) primitives are fully rasterized and their fragments are depth-buffered with their surface attributes; and 2) the (partially) visible fragments left in the depth-buffer are shaded using the associated surface attributes when all geometries are processed at the end of a frame. This guarantees that only visible fragments are shaded.

The main disadvantages with this approach are: 1) deferred shading breaks shading coherence; 2) deferred shading requires full rasterization of all primitives, including invisible primitives and invisible fragments; 3) deferred shading requires shading all subsamples when multi-sample anti-aliasing is applied; and 4) deferred shading does not scale well with a varying number of surface attributes (because it has to handle the worst case).

It would be advantageous to provide a rendering pipeline system that lowers the system cost by reducing the memory bandwidth consumed by the rendering system. It would further be advantageous to provide an efficient rendering pipeline system that writes visible fragments once into the color buffer and retains coherence.

SUMMARY OF THE INVENTION

The invention provides a rendering pipeline system for a computer environment. The invention uses a rendering pipeline design that efficiently renders visible fragments by decoupling the scan conversion/depth buffer processing from the rasterization/shading process. It further provides a rendering pipeline system that reduces the memory bandwidth consumed by frame buffer accesses through screen space tiling. In the invention, raster or rasterization refers to the following process:

For each visible primitive, parameter setup computation is performed to generate plane equations. For each visible fragment of said visible primitive, parameter values are computed. Scan conversion is excluded from the rasterization process.

The invention uses screen space tiling (SST) to eliminate the memory bandwidth bottleneck due to frame buffer access. Quality is also improved by using full-scene anti-aliasing. This is possible under SST because only on-chip memory corresponding to a single tile of the screen, as opposed to the full screen, is needed. A 32×32 tile anti-aliased frame buffer is easily implemented on-chip, and a larger tile size can later be accommodated. Additionally, the invention performs screen space tiling efficiently, while avoiding the breaking up of primitives the invention also reduces the buffering size through the use of single+buffering.

The invention uses a double-z scheme that decouples the scan conversion/depth-buffer processing from the more general rasterization and shading processing. The core of double-z is the scan/z engine, which externally looks like a fragment generator but internally resolves visibility. It allows the rest of the rendering pipeline to rasterize only visible primitives and shade only visible fragments. Consequently, the raster/shading rate is decoupled from the scan/z rate. The invention also allows both opaque and transparent geometries to work seamlessly under this framework.

The raster/shading engine is alternatively modified to take advantage of the reduced raster/shading requirements. Instead of using dedicated parameter computing units, one can share a generic parameter computing unit to process all parameters.

Other aspects and advantages of the invention will become apparent from the following detailed description in combination with the accompanying drawings, illustrating, by way of example, the principles of the invention.

DETAILED DESCRIPTION OF THE INVENTION

Figure 1:
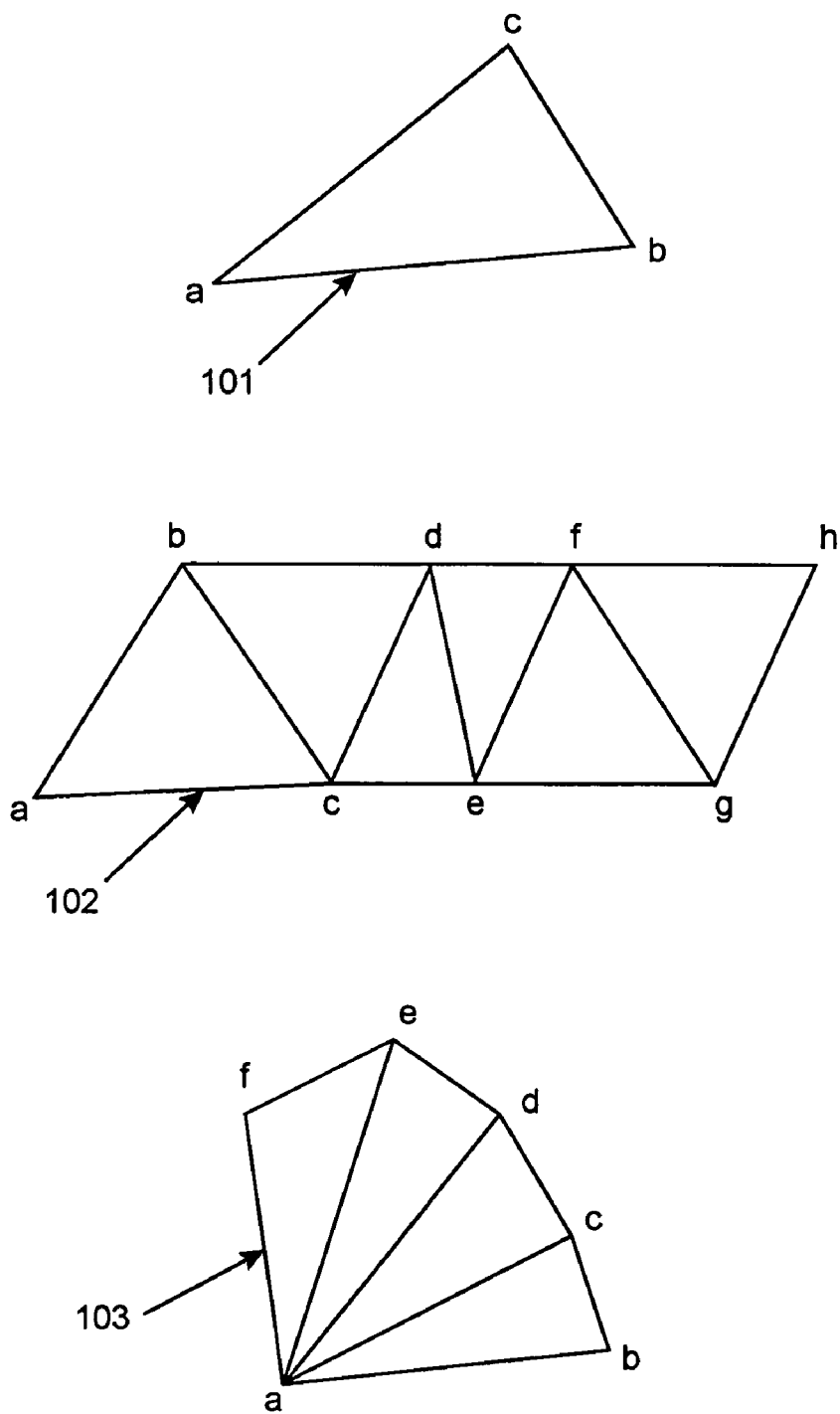
FIG. 1 is a schematic diagram of triangle, strip and fan forms of basic primitives.
Figure 2:
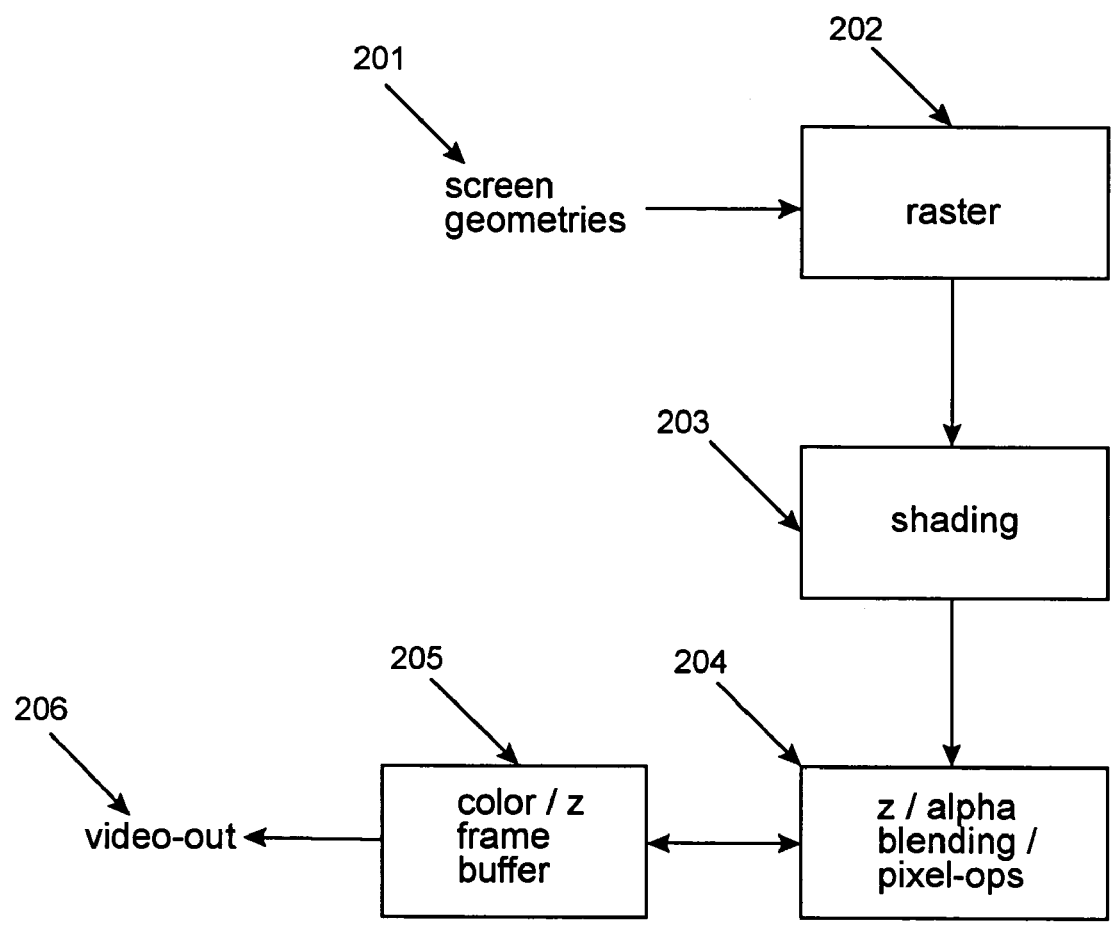
FIG. 2 is a block schematic diagram of the data flow of a traditional rendering pipeline.

As shown in the drawings for purposes of illustration, the invention provides a rendering pipeline system in a computer environment. A system according to the invention provides efficient use of processing capabilities and memory bandwidth through the intelligent management of primitive rendering and memory usage while retaining coherence.

The invention uses screen space tiling (SST) to eliminate the memory bandwidth bottleneck due to frame buffer access. Quality is also improved by using full-scene anti-aliasing. This is possible under SST because only on-chip memory corresponding to a single tile of screen as opposed to the full screen is needed. A 32×32 tile anti-aliased frame buffer is easily implemented on-chip, and a larger tile size can later be accommodated. Additionally, the invention performs screen space tiling efficiently while avoiding the breaking up primitives and reduces the buffering size required by SST.

The invention uses a double-z scheme that decouples the scan conversion/depth-buffer processing from the more general rasterization and shading processing. The core of double-z is the scan/z engine, which externally looks like a fragment generator but internally resolves visibility. It allows the rest of the rendering pipeline to compute parameters for only visible primitives and shade only visible fragments. Consequently, the raster/shading rate is decoupled from the scan/z rate. The invention also allows both opaque and transparent geometries to work seamlessly under this framework.

The raster/shading engine is alternatively modified to take advantage of the reduced raster/shading requirements. Generic parameter pipelines that are shared by all parameters replace dedicated processing units for each surface parameter are another option in the invention.

Figure 4:
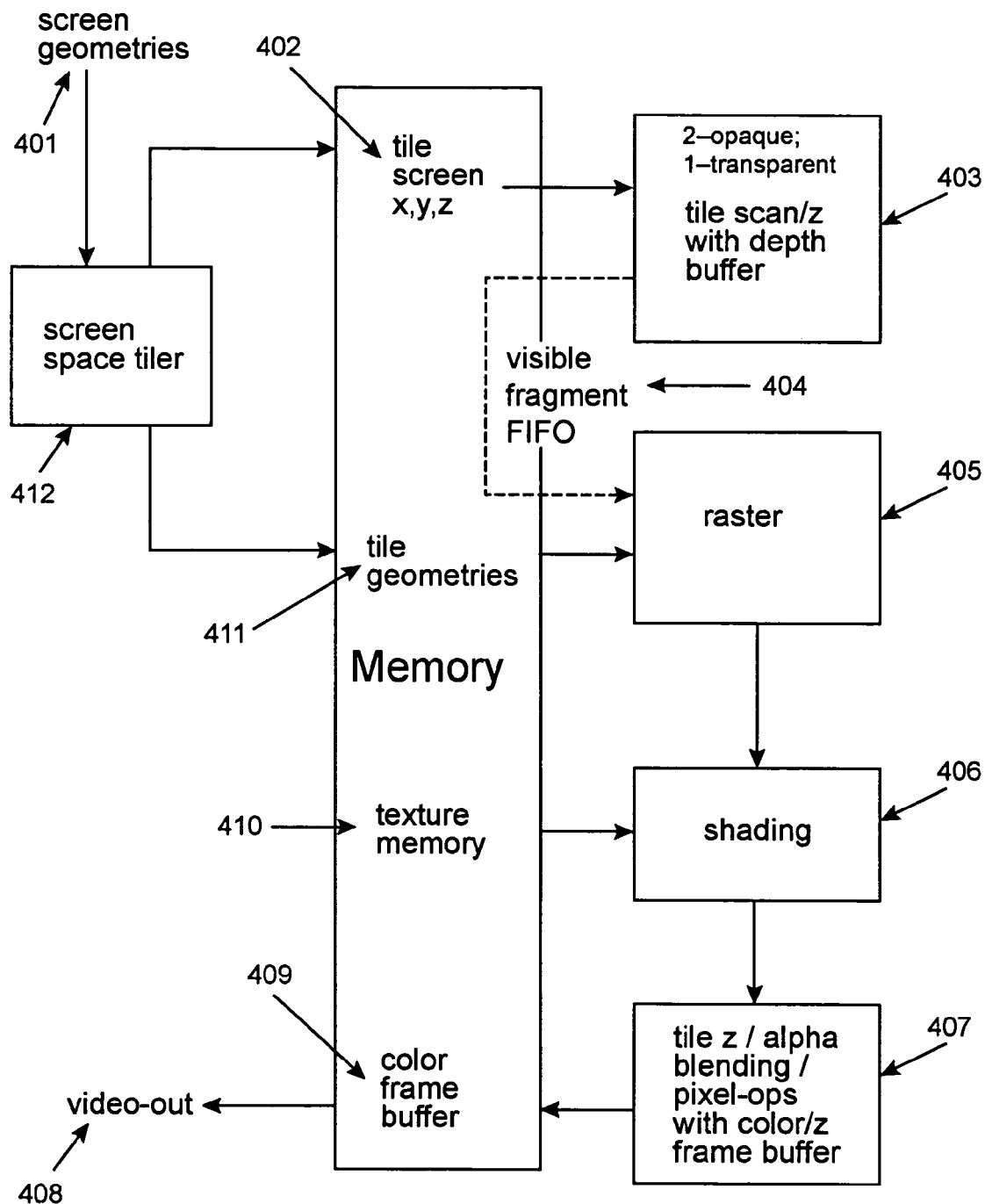
FIG. 4 is a block schematic diagram of the data flow of a preferred embodiment of the invention.

Referring to FIG. 4, the basic data flow of the invention is shown. The geometries in model space 401 are transformed into screen space and the screen space tiler 412 bins a frame worth of geometries into screen tiles. The visibility of all geometries is determined up front using only screen x, y, z coordinates 402 in the scan/z engine 403 for each tile. Visibility information 404 are sent out for rasterization 405 and shading 406. The visibility information 404 are combined with the tile geometries 411 for each tile so that only visible geometries are set up for rasterization. Only visible fragments are fully rasterized and shaded in the raster 405/shading 406 engine. The resulting fragments are sent to the blending engine 407. The blending engine 407 alpha-blends incoming fragments. The blending engine 407 resolves and outputs pixel colors into the frame buffer at the end-of-tile. The tasks of the screen space tiler 412, scan z 403, raster 405/shading 406, and blending 407 engines operate in parallel for the load-balancing of the various processes. This does introduce one frame of latency. If the extra latency is objectionable, then the scan z 403, raster 405/shading 406, and blending 407 engines operate in parallel with the screen space tiler 412 operating serially before them.

Screen Space Tiling 2.1 Overview

Screen space tiling (SST) partitions a screen into disjoint (rectangular) regions (called tiles). It bins all geometries in screen space into tiles that the geometries intersect. Primitives crossing multiple tiles will be binned in all relevant tiles.

Figure 3:
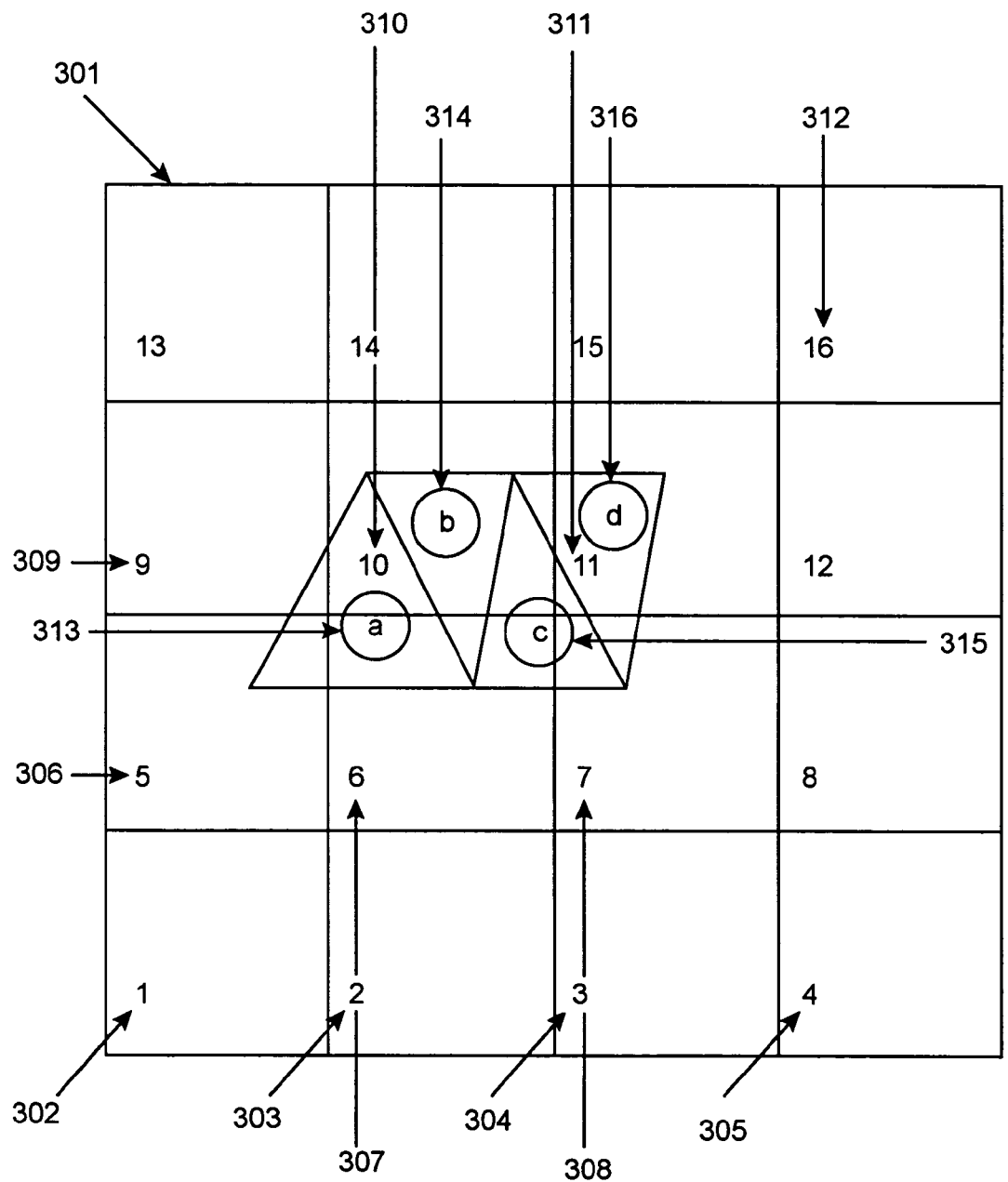
FIG. 3 is a schematic diagram of a screen partition.

Referring to FIG. 3, for example, a screen 301 is partitioned into 16 square, disjoint tiles, numbered 1 302, 2 303, 3 304, up to 16 312. Four triangles a 313, b 314, c 315, and d 316 are binned as follows:

tile 5 306: a 313
tile 6307: a 313, b 314, c 315
tile 7 308: c 315, d 316
tile 9 309: a 313
tile 10310: a 313, b 314, c 315, d 316
tile 11 311: c 315, d 316

This binning process completes when a frame boundary is reached. Then the binned geometries are handed to the rendering pipeline for rendering. Meanwhile, geometry transformation and binning for the next frame gets started. Ideally, geometry transformation and binning of the next frame is performed in parallel with the rendering of the current frame.

One potential drawback with SST is the extra frame of latency it introduces; however, this is generally tolerable.

A tile worth of geometries is rendered without external frame buffer access by maintaining a tile frame buffer on-chip. The final pixel colors are output to the external color buffer in the memory only after geometries for the whole tile have been processed. Therefore, the memory bandwidth bottleneck in a traditional rendering pipeline caused by frame buffer access is eliminated.

Because SST requires binning one frame of geometries, due to the geometry size, the binned geometries have to be stored in external memory. Both writing binned geometries into memory during binning and reading binned geometries from memory during tile rendering consumes memory bandwidth. The memory bandwidth requirement for both reading and writing is examined next. Assume that 1 Mtriangles are represented in strip form. The average triangle size is 50 pixels, the average vertex size is 20~25 bytes with screen x, y, z coordinates, 2 sets of colors, 1 set of 2D texture coordinates, and 1/w in packed form of adequate precision. The average triangle strip size within a tile is about 8 vertices, which gives 1.33 vertex/tri. In addition, up to 50% of the triangles need to be duplicated across multiple tiles. Therefore, the memory bandwidth required for SST is roughly:

2(write/read)*1 Mtris*1.5*1.33 vtx/tri*20~25 bytes/
  vtx=80~100 Mbytes

The memory bandwidth number for SST stays the same whether full-scene anti-aliasing is implemented or not, or geometries are only z-buffered, or complex alpha-blending is performed because the tile frame buffer is on-chip. This bandwidth scales linearly with polygon performance. For example, a performance of 5 Mtris/s and 10 Mtris/s requires 400~500 Mbytes/s and 800~1000 Mbytes/s memory bandwidth respectively. The bandwidth goes down when the average vertex size decreases. In addition, the bandwidth number goes down as the average triangle size becomes smaller, because a tile can now contain longer strips, and the likelihood of triangle duplication in multiple tiles due to tile border crossing is reduced. The asymptotic rate approaches 40~50 Mbytes per 1M triangles as the average triangle size is reduced to less than 10 pixels. This is compared to a traditional rendering pipeline which requires a minimum memory bandwidth of 500 Mbytes/s for frame buffer access for 100 Mpixels non-anti-aliased fragments. The break-even point is 8~10 pixels per triangle when a traditional rendering pipeline becomes competitive in terms of memory bandwidth. However, when 4-subsample multi-sampling is considered, the break-even point becomes 2~2.5 pixels per triangle. Clearly, SST has a significant advantage over a traditional rendering pipeline when memory bandwidth is considered.

2.2 Screen Space Tiler

While in principle binning in SST can be performed by general-purpose programmable engines, a number of reasons motivate designing a simple hardwired screen space tiler.

First, the arithmetic required for binning involves simple fixed-point operations.

For example, for a tile size of 32×32, and vertex screen x, y coordinates represented in a S11.4 format, which involves comparing if the top S[11 . . . 6] bits of all three vertices are the same to decide a triangle is completely inside a tile. This type of arithmetic is inefficient to implement in a general-purpose programmable engine, but cheap and easy to implement in hardware.

Second, it is desirable to maintain the connected forms of primitives as triangle strips/fans as much as possible. If all of the primitives are broken into triangles, then each triangle requires 3 vertices to represent it. If 8-vertex triangle strips, on average, are maintained inside a tiler, each triangle requires just 8/6=1.33 vertices to represent it.

The latter scheme requires only 44% storage size and memory bandwidth compared to the first scheme. To avoid unnecessarily breaking primitives into triangles, a state machine is maintained to keep track of the locations of the two previous vertices, as well as evaluating the current vertex. This type of state machine is difficult to emulate efficiently on a general-purpose programmable engine.

Figure 5:
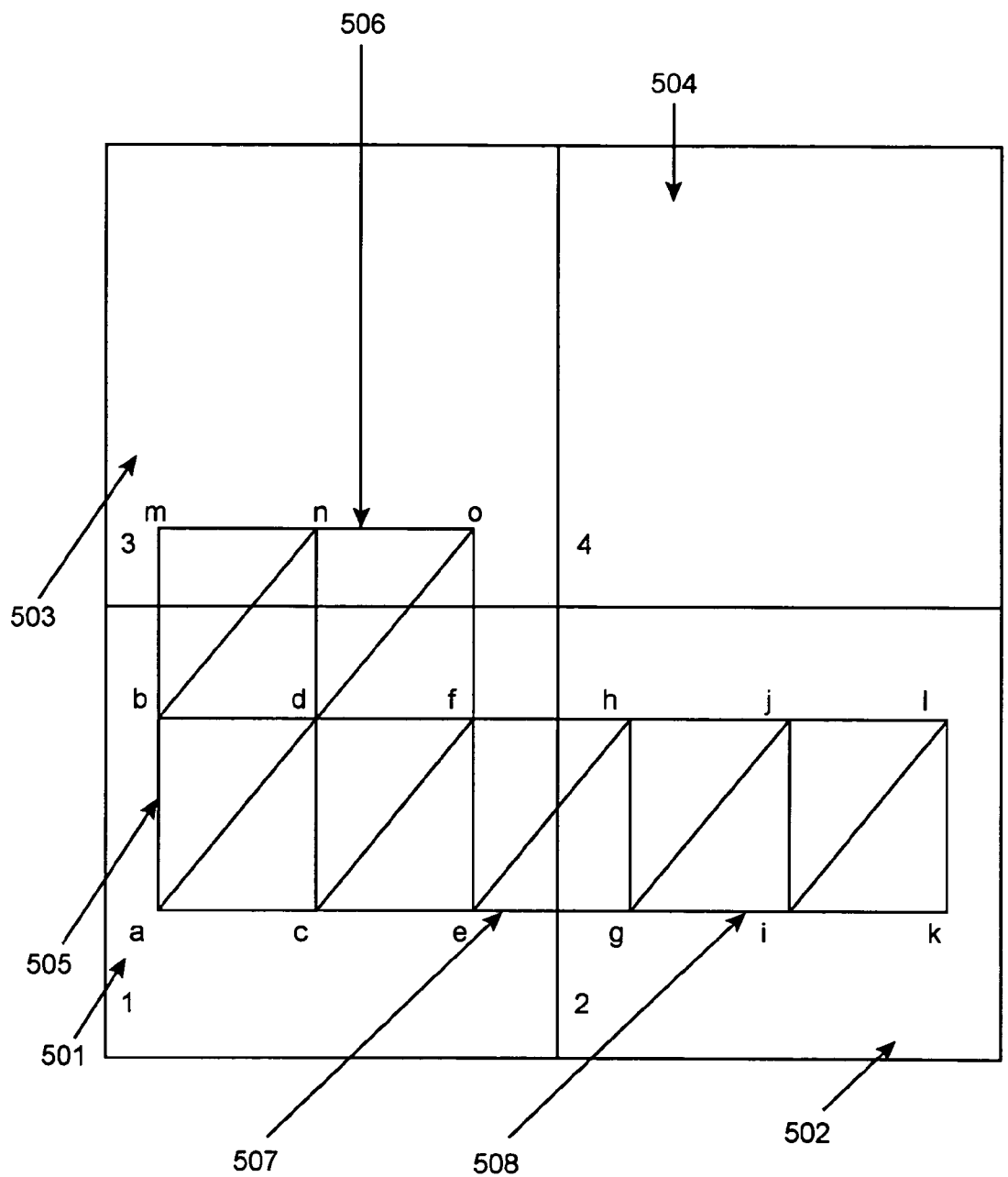
FIG. 5 is a schematic diagram of two triangle strips in an ideal binning situation according to the invention.

With respect to FIG. 5, an ideal binning is shown. Two triangle strips are shown:
1) a, b, c, d, e, f, g, h, i, j, k, l 505
2) b, m, d, n, f, o 506
The binned geometries under ideal binning:
Tile 1: two strips:
1) a, b, c, d, e, f, g, h 507
2) b, m, d, n, f, o 506
Tile 2: one strip
e, f, g, h, i, j, k, l 508
Tile 3: one strip
b, m, d, n, f, o 506
Strip b, m, d, n, f, o 506 straddles tiles 1 501 and 3 503. If there is buffering for only one tile, then many page misses are incurred for memory accesses when ping-ponging outputs between tiles 1 501 and 3 503.

Third, a sufficient level of buffering for binned geometries is desired before pushing them out into the tile binning buffers residing in the memory, as shown in the above example. This eliminates unnecessary memory page misses when dealing with the relatively common cases of border straddling of adjacent tiles by one piece of geometry. Again, this is difficult to do in a general-purpose programmable engine without knowing the problem beforehand.

The invention uses the following solution of a hardwired screen space tiler to resolve these problems. A state machine is maintained to keep track of the current state and locations of the two previous vertices. Given a new vertex, it is determined how it is related to the two previous vertices, what tile(s) to output, and what the new state is. The state information contains two parts:
 a) what tile(s) was the previous triangle in the binning strip/fan output to?
 b) where is the new triangle?
For b), there are three main state values and the corresponding actions:
 1) when all three vertices are in the same tile, then output the triangle to that tile only.
 2) when all three vertices are in two horizontally and vertically adjacent tiles, then output the triangle to both tiles.
 3) otherwise, bin the triangle to all tiles that intersect with the bounding box of the triangle.

Clearly, the handling of case 3) may be too conservative by binning nonintersecting triangles because of the coarse extent of a bounding box.

For a), we maintain outputting in a strip/fan form to a tile as long as the immediately previous triangle of the binning strip/fan has been output to the same tile already. State a) is kept up-to-date after each new vertex.

The state machine is very straight-forward, and it can be made more complicated to make binning more efficient (for case 3) mainly) in terms of memory bandwidth and buffering size. However, the current algorithm goes a long way to handle common cases efficiently. For example, when the state machine is applied for the strips in FIG. 5, we obtain the same binned geometries as those under ideal binning result.

Independent buffers (in granularity of 32~128 bytes) are maintained that correspond to four adjacent tiles (in the 2×2 arrangement) and push data into the tile binning buffers in memory only if the system runs out of buffering. When this happens, either enough data have accumulated for the current tile to output into the memory as a block, or more than four tiles are involved for a primitive. These four buffers significantly reduce the chance of page misses with regard to primitives that straddle adjacent tiles. This is because, for reasonably-sized primitives, the worst case occurs when a triangle straddle four tiles at the same time. FIG. 5 shows a case where two buffers are needed. Note that very large polygons can still cause many page misses. However, a reasonable average polygon size (e.g. 50 pixels/tri) dictates that there are not many large polygons in the scene. Therefore, there is no need to worry about them.

2.3 Page-Based Single+Buffering for SST

To render 1 Mtris/s, at a frame rate of 30 hz, the amount of memory needed is:

80~100 Mbytes/s/30/s=2.67~3.33 Mbytes to buffer the geometry. The buffering size scales linearly with the performance. For 5 Mtris/s:

5*2.67~3.33 Mbytes=13.33~16.67 Mbytes

This is quite a bit, but still reasonable.

It is desirable to transform and bin geometries of the current frame in parallel with rendering geometries of the previous frame. This forces rendering to occur serially after transformation/binning with pure single buffering, which can have significant resource utilization ramifications (it might be okay for reducing latency however).

A trivial solution is to double-buffer SST. While transformation/binning of the current frame is going on in one buffer, the rendering of the previous frame is using the other buffer. The roles of these two buffers are simply switched at the frame boundary. Unfortunately, double buffering may require too much buffering memory to accommodate a rendering performance of 5~10 Mtris/s.

In light of this, the invention uses a page-based scheme, called single+buffering. The idea behind this is to break buffering memory used for binning into pages of sufficient granularity (e.g., physical pages in the memory).

There are two types of pages: pages currently allocated to tiles, and unused pages. Unused pages are kept track of in an unused page pool. Each tile is allocated with a variable number of pages scattered in the memory. Whenever the screen tiler needs more pages so that it can store more data to a tile, it tries to grab pages from the unused pool. If it succeeds, the references of these pages are removed from the unused page pool, and these pages are allocated to the requesting tile. If it fails, the screen tiler stalls (which in turn stalls the upstream geometry processing) and waits until pages get released back into the unused pool. After a page has been consumed by the rendering pipeline, it is released back into the unused page pool. This page-based scheme also removes the issue of limiting the memory size for a single tile, because more pages can always be allocated to a single tile as long as there are unused pages left in the page pool. Therefore, the case that all geometries lying in a single tile does not cause an exception under this scheme.

The page-based single+buffering has as much memory as is required for binning under single-buffering. It is broken into pages, plus some extra pages (in the order of a few dozen to a few hundred). The memory requirement for this scheme is considerably less than that for double-buffering.

If the transformation/binning process is approximately load-balanced with the rendering process, the page-based single+buffering keeps both transformation/binning and rendering running smoothly. If transformation/binning overruns rendering, then the transformation/binning stalls. If rendering overruns transformation/binning, rendering stalls.

It makes sense to keep critical information of the unused page pool (e.g., the first few unused pages) on chip in the screen space tiler to avoid accessing the unused page pool in the memory too often in an efficient hardware implementation. Similarly, to make prefetching of binned geometries easier and more efficient in the rendering pipeline, a (partial) list of scattered pages for a binned tile can be maintained on chip in the rendering pipeline as well.

Double-Z and Scan/Z Engine 3.1 Summary

The invention uses a double-z method that decouples pixel shading rate from scan conversion and z-buffer rate. Here, a pixel is a unit area of the frame, and a fragment is the intersection of a primitive with a pixel.

Assuming that a frame of geometries has been transformed into screen space and buffered, the double-z algorithm relies on a scan/z engine that generates visibility through two passes. The first pass generates the depth information in a depth buffer by scan converting primitives and interpolating/comparing/storing depths per pixel using only screen x, y, z coordinates in the primitive forms such as points, line, triangles, strips/fans. Neither rasterization for other surface parameters nor shading/blending computation is performed. The second pass uses the depth-buffer generated by the previous pass, scan converts primitives using screen x, y, z coordinates again, and outputs fragments with screen depths less than or equal to the depths in the depth buffer. These fragments contain pixel locations and corresponding coverage masks. These fragments correspond to the visible fragments. Further, based on if a primitive generates any visible fragment, the visibility information with respect to entire primitives can also be output. Primitives generating visible fragments are called visible primitives. The visibility information is covered in more detail later.

The visibility information is sent to the rest of the rendering pipeline. Only visible primitives need to perform the setup computation for rasterizing surface parameters, and only visible fragments have their surface parameters generated and their shading computed. This is an extreme example of raster/shading-after-z where only absolutely necessary raster/shading is performed.

Externally, the scan/z engine looks virtually identical to a fragment generation engine; internally, it also resolves visibility. The rest of the pipeline need not be aware of this, however, as long as the visibility information can be combined with the screen geometries correctly. Because the scan/z engine separates the scan conversion of primitives from the rasterization of primitives, the raster engine needs to be designed to fit this style of rendering pipeline. The raster engine design is described later.

When depth-buffering is disabled, i.e. new geometries are painted on top of old geometries (as in the painter's algorithm), this scheme still works by assigning primitives depths from farthest z's to closest z's.

Note that the two passes in the scan/z engine only require vertex screen x, y, z coordinates in the primitive forms. It is a significant memory bandwidth waste if the scan/z engine-reads all geometry information but only uses vertex screen x, y, z coordinates. This issue is addressed below.

The scan/z engine resolves visibility under either non-anti-aliasing, or anti-aliasing. In the case of anti-aliasing, the depth buffering may be either multi-sample z-buffer based, or fragment A-buffer based.

Double-z has a number of advantages over existing approaches:
1) The saving of double-z is automatic and predictable without assuming how scenes are modeled, whether more statics or more dynamics, front-to-back or back-to-front; this makes applications easier to write.
2) Double-z does not require time-consuming priority updates.
3) Double-z does not break shading coherence existing in user applications, and visible primitives are rendered in-order.
4) Other than scan conversion and z, double-z allows set-up computation for rasterizing only visible primitives, rasterization and shading for only visible fragments.
5) Fragments are output from the scan/z engine, as opposed to individual subsamples; this allows raster/shading computation to be performed on a per-fragment basis as opposed to a per-subsample basis.
6) The scan/z engine for double-z looks like any other fragment generator; this makes the downstream interface simpler and also allows proper handling of all exception cases.

The possible problems with double-z are:
1) Scan/z has to be performed in two passes; this implies the scan/z rate has to be doubled.
2) For a frame, if rendering has to wait until the visibility information is generated, it significantly reduces the efficiency of our rendering pipeline. One extra frame of pipelining can be added, but the latency issue is more severe.

When double-z is combined with screen space tiling, however, the second problem more or less disappears, and the first one becomes much more minor. When SST is used, Scan/z of one tile is performed asynchronously in parallel with raster/shading/blending of another tile, i.e. raster/shading/blending is decoupled from scan/z. This allows both scan/z and raster/shading/blending to perform at full efficiency.

Under SST, the depth buffer is kept on-chip as opposed to in-memory. Because the external memory access is gone, SST makes scan converting and depth buffering of the vertex screen x, y, z coordinates of all primitives faster and makes the doubling of the scan/z rate a much easier task. Double-z under SST introduces an extra step where vertex screen x, y, z data is read from memory a second time. However, this small memory bandwidth hit is offset by the large bandwidth savings resulting from eliminating access to an external framebuffer and from eliminating the need to further process invisible primitives and invisible fragments.

3.2 Non-Anti-Aliasing and Anti-Aliasing Consideration

3.2.1 Non-Anti-Aliasing

It is straightforward to implement double-z under non-anti-aliasing. The invention uses a simple z-buffer implementation. The following is a table to translate the common z-compare logic for single pass rendering to double-z z-compare logic:

| single-pass rendering | double-z 1st z pass | double-z 2nd z pass |
|---|---|---|
| >= | >= | >= |
| > | > | >= |
| <= | <= | <= |
| < | < | <= |

An alternative to achieving effectively the same result is to maintain the same kind of z-compare logic in both passes of double-z as that for single-pass rendering, but adding a small z offset in the first pass of double-z. This piece of logic also comes in handy when dealing with coplanar primitives.

3.2.2 Anti-Aliasing

Two well-known methods for full-scene anti-aliasing are multi-sample z-buffering and fragment-based A-buffering.

Under SST, it is possible to allow both anti-aliased and non-anti-aliased double-z implementation in the same architecture. To achieve anti-aliasing, more on-chip memory is needed. When users select non-anti-aliasing, it would be advantageous to utilize the on-chip memory otherwise used for anti-aliasing.

A reasonable choice is to make the tile size larger. For example, a 32×32 tile rendering engine with 4-sample multi-sampling can be turned into a 64×64 tile rendering engine with non-anti-aliasing. This larger tile size reduces the overhead of geometry duplication across tiles as well as reducing the chance of breaking up strip/fan forms.

3.2.2.1

Multi-sample z-buffering is a straightforward extension of non-anti-aliasing double-z. The only concern is that a fragment is considered visible if any subsample in its coverage passes the z-compare test in the 2nd pass of double-z. However, the visible coverage of this fragment includes only those subsamples that are visible, and this is the fragment coverage for outputting from the scan/z engine to the rest of the rendering pipeline.

3.2.2.2 Fragment-Based A-Buffer

Fragment-Merging A-buffer anti-aliasing is described below. The visible coverage of a fragment is output if the fragment is at least partially visible. One important feature is that roughly one fragment per pixel is rasterized/shaded when using fragment merging under double-z. Under fragment merging, fragments of similar shading are merged. If the combined fragment is visible, only one fragment with the combined visible coverage mask is output for further raster/shading. Again, the advantage that the scan/z engine looks like a fragment generation engine makes this merging process going on inside the scan/z engine transparent to the raster/shading engine. Fragment-merging usually reduces the depth of A-buffer by half without altering the anti-aliasing quality.

Fragment merging is easily implemented by attaching one shading id bit to each depth of A-buffer and having a fast bit clear mechanism. The decision of whether fragment merging should be enabled or not is a user choice based on how smoothly the shading varies for fragments of abutting primitives (normally comprising the same object). More details on fragment merging using shading id bits are presented below, as well as details about fast on-chip tile clearing.

3.3 Other Variations

Double-z can be used in conjunction with hierarchical z-buffering. Under hierarchical z-buffer, the second pass double-z is extremely efficient because all invisible fragments are rejected in the z-testing stage (possibly at very coarse levels of hierarchical z-buffer). The first pass can be sped up if geometries are somewhat sorted from front-to-back during high-level processing or by randomizing screen geometries.

Double-z can be performed in either a conservative fashion or an opportunistic fashion. In the former case, all geometries are scan converted and depth-buffered in both passes. In the latter case, only a fraction of all geometries (possibly random) need to participate in the first pass of double-z. This reduces the need for doubling the scan/z rate. The drawback is that the visibility information are conservative, and invisible primitives/invisible fragments end up being rasterized and shaded in the raster/shading engine. The tradeoff is thus trading a higher scan/z rate for a lower raster/shading rate or the other way around.

3.4 Compatibility With One-Pass Raster/Shading-After-z

One-pass raster/shading-after-z scan converts and depth-buffers screen geometries only once. It performs set-up computations for only primitives that have fragments passing the depth test, and rasterizes and shades fragments passing the depth test. As previously mentioned, this scheme relies heavily on the fact that geometries are rendered from front-to-back and there are little dynamics in the scene. The scan/z engine permits this operating mode by skipping the first pass of double-z, and allowing the second pass to update the depth buffer. Externally, double-z and one-pass shading-after-z behave virtually identical except that in the case of one-pass shading-after-z it may generate a lot more primitives and fragments passing the depth test.

3.5 Load Balancing Between Scan/z and Raster/Shading/Blending

Because the scan/z engine processes all primitives and all fragments, and the raster/shading/blending engine processes only visible primitives and visible fragments, the raster/shading/blending rate is much lower than the scan/z rate. However, due to decoupling of the scan/z rate and the raster/shading/blending rate, visible fragments can leave the scan/z engine and subsequently arrive at the raster/shading/blending engines at an uneven rate, whereas the latter engines process visible primitives and visible fragments at a relatively steady pace. This may cause a load balancing problem. For example, where all tiles with depth complexity=1 come first, and all tiles with depth complexity=10 come last, then the scan/z engine overruns the raster/shading/blending engine initially, and consequently stalls the scan/z engine. The efficiency of scan/z engine suffers greatly.

To load balance the scan/z computation and raster/shading/blending computation, a large FIFO is placed between the scan/z engine and the raster/shading/blending engine (which implies using memory as a FIFO)

The output rate of the scan/z engine can be balanced by reordering tiles. In the case of SST, the order of tile rendering is reordered by matching the tiles with high depth complexity with those of low depth complexity. Given sufficient FIFOing between the scan/z engine and raster/shading/blending engine, the net effect is that the input rate into raster/shading/engine is less bursty. An algorithm to accomplish this is presented below in 3.5.1.

Regardless which method is used, a sizeable FIFO of minimally a few thousand fragments deep and potentially much larger is needed for load balancing. Therefore, the scan/z engine can be temporally quite a bit ahead of the raster/shading/blending engine.

3.5.1 A Tile-Rendering-Order Reshuffle Algorithm to Load Balance Scan/z and Raster/Shading/Blending Step
1) Maintain a sum for each tile and a sum for the whole screen, all initialized to 0.
2) For each triangle to be binned, compute a quantity A (to be defined later) in either the geometry engines or the screen space tiler. Add this quantity A to the sums of all of the tiles that the triangle intersects, then add this quantity to the global sum.
3) Divide the global sum by the number of tiles to get a tile average.
4) Partition all tiles into two groups in one pass: group 1 contains tiles whose quantities A are lower than or equal to the tile average, and group 2 contains tiles whose quantities A are higher than the tile average; the tile average is subtracted from quantities A at both groups.
5) Perform a merge-sort like computation between these two groups; set a global value B, initialized to 0: whenever $B \geq 0$, choose the next unchosen tile from group 1, output the tile number, and discard the tile; whenever $B<0$, choose the next unchosen tile from group 2, output the tile number, and discard the tile; this process is repeated until all tiles in both groups are processed.

Figure 6:
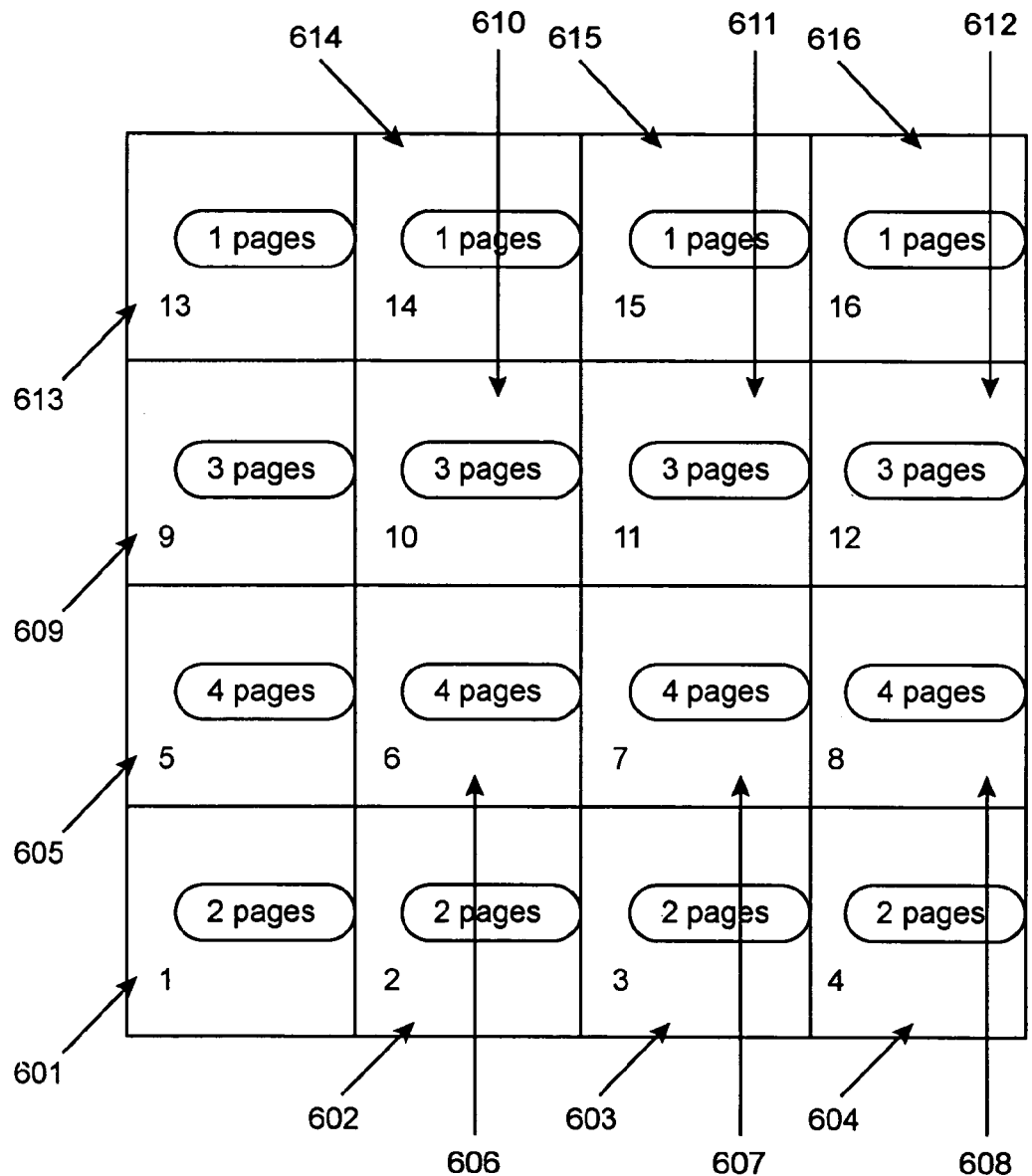
FIG. 6 is a schematic diagram of a depth complexity distribution that arises frequently in graphics applications due to perspective according to the invention.

The output list is the desired order of rendering tiles to achieve load-balancing between scan/z and raster/shading/blending engines. Step 5) essentially matches the tiles with higher A values with those tiles with lower A values, not necessarily one-to-one. Referring to FIG. 6, a depth complexity distribution that arises frequently in graphics applications due to perspective is shown. Using step 3), the tile average is 2.5.

Using step 4), group 1, has the following tiles and biased quantities:

1 601: −0.5, 2 602: −0.5, 3 603: −0.5, 4 604: −0.5, 13 613: −1.5, 14 614: −1.5, 15 615: −1.5, 16 616: −1.5

Group 2 has the following tiles and biased quantities:

5 605: 1.5, 6 606: 1.5, 7 607: 1.5, 8 608: 1.5, 9 609: 0.5, 10 610: 0.5, 11 611: 0.5, 12 612: 0.5

Using step 5) the following ordered list of tiles is generated:

1 601, 5 605, 2 602, 3 603, 4 604, 6 606, 13 613, 7 607, 14 614, 8 608, 15 615, 9 609, 10 610, 16 616, 11 611, 12 612

The moving average of this list is very close to 2.5.

A can be the screen area of a triangle. In this case, step 2) tries to compute the sum of screen areas inside a tile of all triangles intersecting with the tile. This sum corresponds to the average depth complexity of the tile. Notice that step 2) is only an approximation to achieve the objective since the screen area outside the tile is also accounted for. This scheme roughly the depth fill rate required for a tile.

A can also be the unit identity, 1. In this case, step 2) accounts for the number of triangles intersecting the tile. The scheme roughly models the scan/z setup rate for a tile. The third alternative is to use a combination of these schemes.

3.6 Transparency

Double-z computation primarily applies to opaque geometries. To handle potentially transparent geometries properly, they need to be processed after all opaque geometries are processed in the scan/z engine. Potentially transparent geometries are identified at the up stream of the graphics processing (e.g., during SST), and are binned separately from opaque geometries. After all opaque primitives have been processed using double-z in the scan/z engine, potentially transparent primitives are scan converted and depth compared by using the depth buffer generated by opaque primitives. Only those fragments equal to or closer than the depths in the depth buffer are considered potentially visible transparent fragments, which similarly lead to potentially visible transparent primitives. Only these potentially visible transparent primitives/fragments are rasterized and shaded.

Because externally the scan/z engine looks like a fragment generator, from the raster/shading engine's perspective, potentially visible transparent primitives/fragments are virtually indistinguishable from visible opaque primitives/fragments. As described below, the depth information of potentially visible transparent fragments are computed in the raster engine. A final depth buffer is needed in the blending engine to guarantee correct handling of potentially transparent geometries.

Potentially transparent geometries come from two sources, one is vertex transparency associated with vertex alphas, the other is from texture transparency. The first case is detected during vertex processing in the geometry engines. The latter case is detected at texture processing time in the geometry engines.

Planar primitives associated with potentially transparent textures can take advantage of double-z by segmenting potentially transparent textures into blocks that are completely opaque (every point inside the block is opaque under filtering), completely transparent (every point inside the block is transparent under filtering), and partially transparent (at least one point in the block has a semitransparent alpha under filtering). A reasonable basic block size is 4×4 or 8×8. Planar primitives bound to potentially transparent textures are tessellated into patches in texture space according to the texture blocks. The patches corresponding to completely transparent blocks are thrown away before they are considered for rendering. The patches corresponding to completely opaque blocks are rendered using double-z. The patches corresponding to partially transparent blocks are rendered using the mechanism previously outlined.

The texture segmentation can be performed hierarchically to improve tessellation efficiently. As long as the segmentation is conservative under filtering, it is guaranteed to render the correct result no matter which level of the segmentation pyramid is chosen for rendering. The tradeoff is double-z efficiency (tessellating potentially transparent geometries as fine as possible) versus tessellation efficiency (tessellating potentially transparent geometries as coarse as possible). A reasonable way is to use the projected screen area of a primitive, and decide which level of transparency pyramid to use.

For planar primitives such as triangles, one can take advantage of the fact that the plane equations generated by the pre-tessellated primitives are the same as the plane equations generated for the tessellated patchesf. Therefore, creating surface parameters for these small patches is not needed; one can simply reuse the surface parameters of the large pre-tessellated primitives. Doing this reduces both the buffering size of binning and the memory bandwidth of data sent to the raster/shading/blending engine.

A similar scheme can be used potentially for chroma-key acceleration.

3.6 Fast Clear of the Depth Buffer

A scheme to fast clear the on-chip tile depth buffer is described below (Section 6.5).

Raster/Shading Engine 4.1 Overview

A raster/shading engine that takes advantage of raster/shading-after-z, in particular, double-z, is described in this section. Raster/shading-after-z refers to a preliminary visibility computation that has been performed to throw away invisible geometries/fragments. For example, double-z as described earlier generates only visible opaque primitives/fragments and potentially visible transparent primitives/fragments.

The input to the raster/shading engine consists of two streams. The first stream is the screen geometry stream and the second is the visibility stream. The contents and synchronization mechanism between these two streams are addressed later.

Because a raster/shading-after-z mechanism such as double-z has already been applied to eliminate invisible geometries/fragments in the scan/z engine, only visible primitives and their corresponding visible fragments are dealt with by the raster/shading engine. The output from the raster/shading engine is sent to the blending engine (the z/alpha-blending/pixel-op unit), where the final pixel colors are resolved.

Note that the raster/shading engine does not need to have the notion of tiles even if SST is used, other than having a trivial tile-coordinate to screen-coordinate translation mechanism so that the visibility information can be better compressed (visible fragments are represented by tile offsets as opposed to screen offsets). Also note that the raster/shading engine does not distinguish between multi-sample anti-aliasing and A-buffer anti-aliasing because the same kind of visibility information (fragments) is given. Non-anti-aliasing is trivially dealt with by turning the coverage mask of a visible non-anti-aliased fragment into one that fully-covers the pixel.

Figure 7:
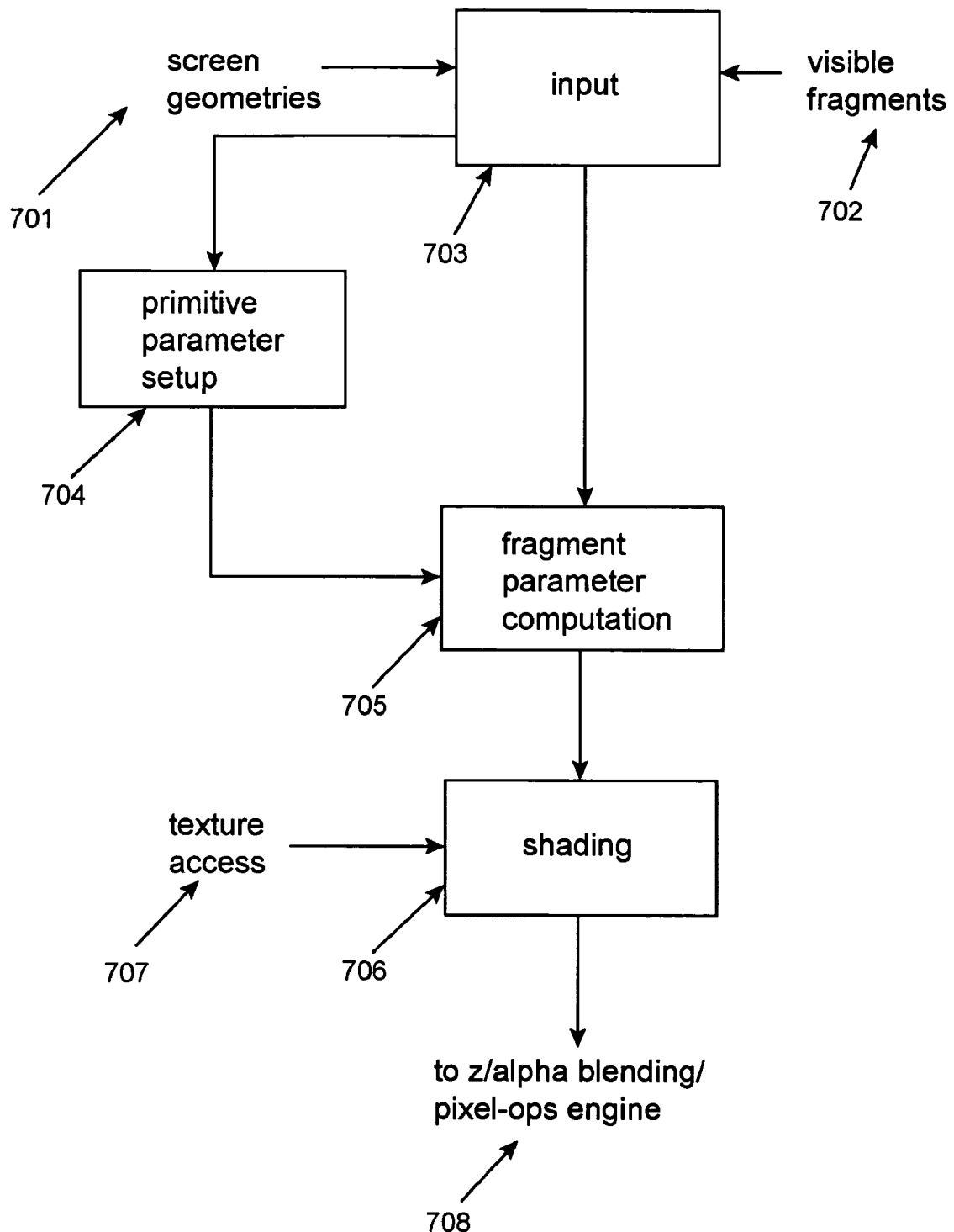
FIG. 7 is a block schematic diagram of the data flow of the raster/shading engine in a preferred embodiment of the invention.

The following issues are addressed:
1) How to rasterize visible primitives
2) How to translate a lower raster/shading rate into lower hardware costs
3) How to handle transparency With respect to FIG. 7, the data flow of the raster/shading engine is shown. Screen geometries 701 and visible fragments 702 are input 703 into the raster/shading engine. Only primitive parameters for visible primitives are setup 704 705. The visible fragment parameters are then computed 705 using previous setup information. Shading 706 is performed using the texture data 707. The result from the shading 706 is then sent to the blending engine 708.

For the following discussion primitives are assumed to be triangles (triangle strips/fans, quads, etc., can be decomposed to triangles).

4.2 Raster Setup and Direct Computation

For any parameter P (such as colors and not-yet perspectively corrected texture coordinates), the linearly interpolated value of P at a fragment [x, y] of a triangle can be generally expressed as:

$$P = Pi + x*dPdx + y*dPdy \quad (EQ\ 1)$$

where:

$$area = (x1-x0)*(y2-y0)-(x2-x0)*(y1-y0)$$

$$dPdx = ((P1-P0)*(y2-y0)-(P2-P0)*(y1-y0))/area$$

$$dPdy = ((x1-x0)*(P2-P0)-(x2-x0)*(P1-P0))\ area$$

$$Pi = P0 - x0*dpdx - y0*dpdy \quad (EQ\ 2)$$

Figure 8:
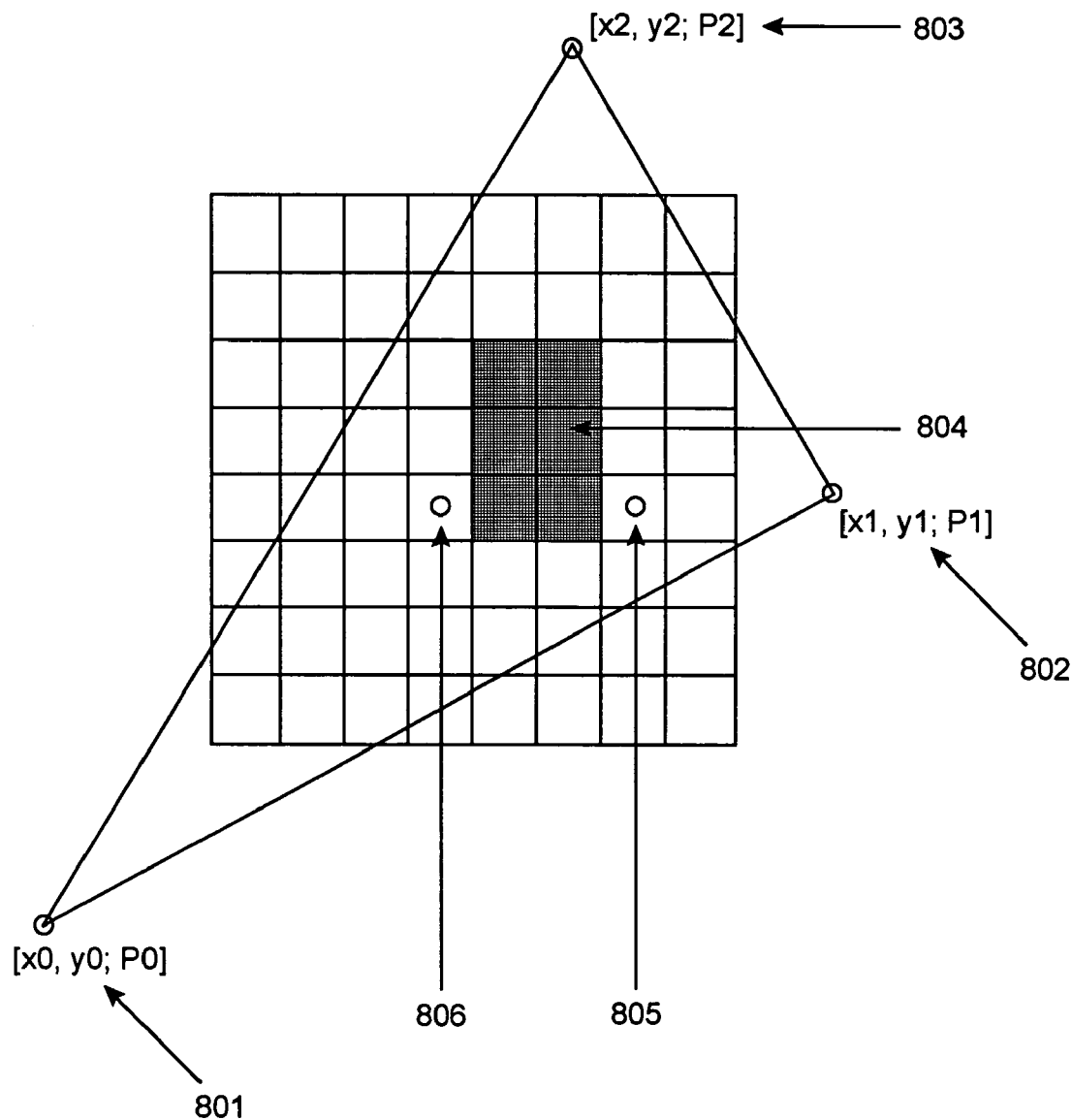
FIG. 8 is a schematic diagram of a triangle and its visible fragments according to the invention.

In FIG. 8, P0, P1, P2 are the values of P at the three vertices [x0, y0] 801, [x1, y1] 802, and [x2, y2] 803 of the triangle. Here, the value of P of a fragment is decided by computing P at the corresponding pixel center without considering the coverage of that fragment. The current fragment [x, y] 806 and next fragment [x+3, y] 805 are shown.

A traditional scanline based raster engine frequently takes advantages of scan coherence of successive fragments on the same scan-line of a triangle, and uses forward differencing (also called incremental additions) to compute parameter values for successive fragments:

$$newP = oldP + dPdx \quad (EQ\ 3)$$

where oldP is P at [x, y], newP is P at [x+1,y] for a horizontal scan-line.

$$newP = oldP + dPdy \quad (EQ\ 4)$$

where oldP is P at [x, y], newP is P at [x,y+1] for a vertical scan-line.

This works because by nature successive fragments of the same scan-line are adjacent, either off by 1 in the x dimension for a horizontal scan-line, or off by 1 in the y dimension for a vertical scan-line using a traditional scan-line algorithm.

In the rendering pipeline of the invention, invisible fragments have already been discarded. This leaves much less scan coherence between successive fragments. It is therefore difficult to use the forward differencing optimization to compute surface parameters without sacrificing efficiency by computing surface parameters for intervening invisible fragments.

In this case, a direct-compute method can be used that directly computes (EQ1) at each fragment.

It is possible to design a hybrid scheme that uses both direct-compute and forward differencing if the fragments are generated in a predefined group form (a group of fragments at a time as opposed to one fragment at a time). The advantage is that the amortized hardware cost for per-fragment computation is lower because one can use direct compute (which requires two multiples and two adds per parameter) for a fraction of the fragments and the other fragments are generated by forward differencing (which requires one add per parameter). The disadvantage is that fragment efficiency is lower, because potentially invisible fragments are also rasterized.

4.3 Resource Sharing in Raster/Shading Computation

Because only visible geometries/fragments are seen by the raster/shading engine, the setup rate for visible primitives and the raster/shading rate for visible fragments are much lower than the primitive rate and the fragment rate for all geometries without double-z. An immediately obvious benefit is that the memory bandwidth due to texture access is vastly reduced because only visible fragments need to perform texture access for shading.

To go one step further, it is desirable to take advantage of these lower raster/shading rates by sharing resources as much as possible to reduce the hardware costs. For example, as opposed to having 11 fragment direct-compute units for all parameters in Direct3D (8 color parameters, 2 texture parameters, and 1/w), only 2 direct-compute units for everything are needed if the visible fragment rate is 2/11 of the regular fragment rate without double-z. The same observation also applies to parameter setup for primitives.

In the raster engine, this is done by introducing the notion of generic primitive setup and fragment direct-compute pipelines. In general, a surface parameter P can be classified into two categories: P requires a large dynamic range (i.e. P has a wide range of values it can achieve), such as texture coordinates, or P requires a small dynamic range (i.e. P has a narrow range of values it can achieve), such as colors. Roughly, the first type corresponds to surface parameters that require perspective correction, e.g. P is s/w=s*1/w, whereas the second one does not, e.g. P=r. The first type usually requires either floating-point operations or very wide fixed-point operations for both primitive setup and fragment direct-compute, whereas the second type requires either little floating-point operations for primitive setup, or relatively small fixed-point operations for fragment direct-compute.

One important fact is that all surface parameters use identical expressions for primitive setup and fragment direct-compute. The dynamic ranges and precision requirements are also narrowly clustered. For example, colors are all similar, and texture coordinates are all similar. Therefore, there can be a set of generic primitive setup and fragment direct-compute pipelines for all parameters. Two possibilities are:

1) Implement only one type of pipeline that is capable of handling parameters of a large dynamic range; this automatically takes care of parameters of a small dynamic range.
2) Implement two types of pipelines: one for parameters of a large dynamic range and one for parameters of a small dynamic range.

Figure 9:
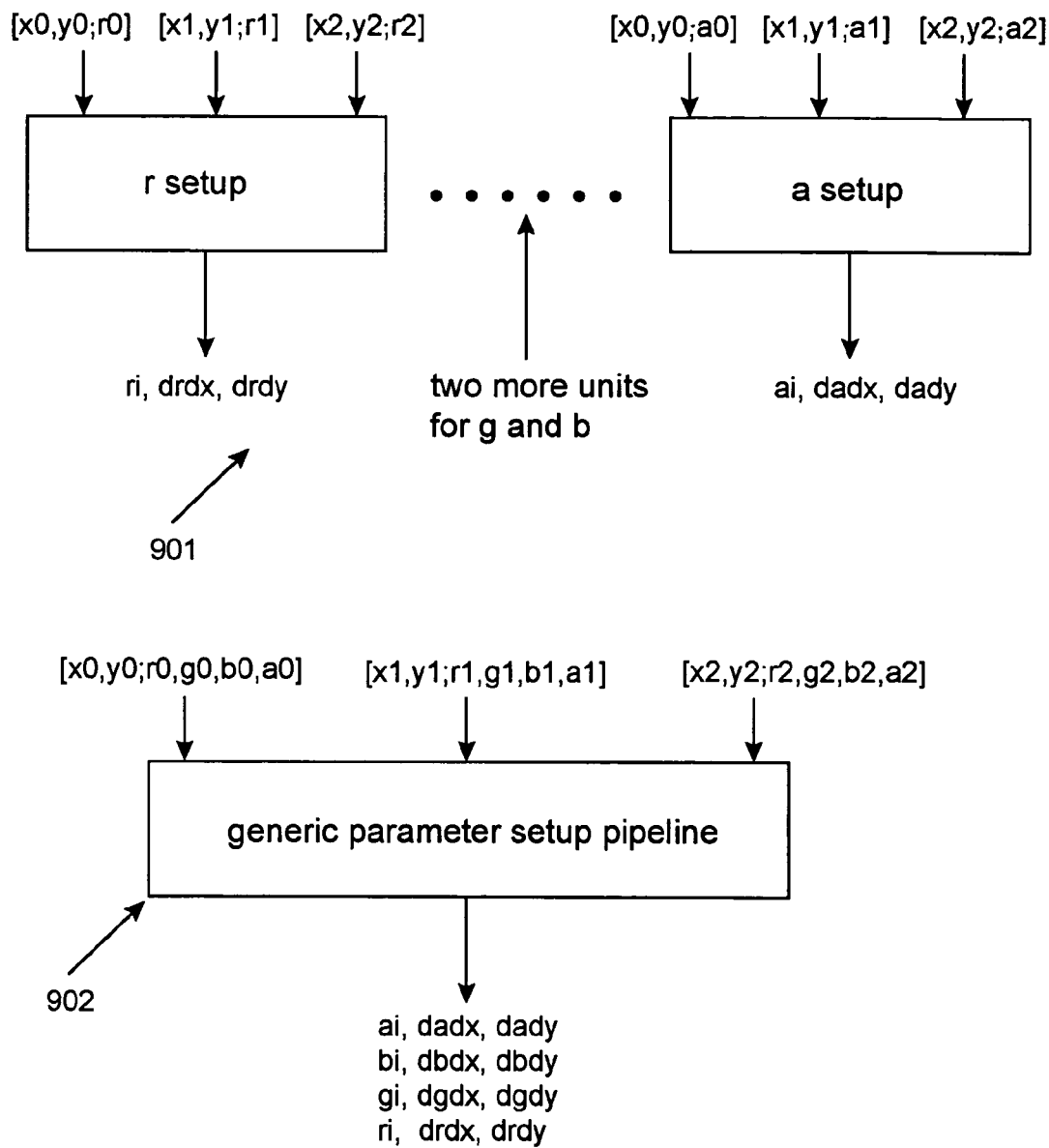
FIG. 9 is a block schematic diagram of the data flow of primitive parameter setup pipelines according to the invention.

Then, as opposed to dedicated independent primitive setup and fragment direct-compute units to each individual parameter, as is typically done in a traditional raster engine, all parameters are simply put through the same set of generic setup and direct-compute pipelines. For example, there is no longer one setup unit and one direct-compute unit for each of r, g, b, a, specular r, specular g, specular b, and specular a as defined in Direct3D API, there is only some number (possibly 1) of generic setup pipelines and direct-compute pipelines that handle all of these parameters in a pipelined fashion. Based on the performance target, the number of these pipelines that are needed can be decided. With respect to FIG. 9, the comparisons of primitive setup computations of four color parameters between a traditional raster engine 901 and the raster engine of the invention 902 are shown. These are called generic primitive setup and fragment direct-compute pipelines, i.e. generic parameter pipelines.

The number of generic parameter pipelines are determined by the level of performance desired. If a generic primitive setup pipeline is capable of setting up 32 M parameters/s, and the performance goal is setting up 8 M visible triangles/s, then a single generic setup pipeline is needed to set up parameters r, g, b, and a, as opposed to four pipelines. The same argument applies to fragment direct-compute. Double-z in the scan/z engine eliminates invisible primitives and invisible fragments, and consequently yields a much lower visible primitive setup rate and a much lower visible fragment direct-compute rate. This gives a much better opportunity for resource sharing by designing general parameter pipelines. Otherwise, to achieve the desired level of performance, both setup and direct-compute would have to be performed at a much higher rate, and would not be able to take advantage of resource sharing. This type of resource sharing can just as easily be done in perspective correction and shading computations, and create other generic parameter pipelines. Fundamentally, because the shading rate for visible fragments is much lower compared to the fragment shading rate if invisible fragments are not eliminated, there is a much longer clock time to shade a single fragment under double-z. This allows the identification of similar types of computations within a parameter and among parameters when shading a fragment. The same hardware for similar type of computations is used as long as the throughput of sharable generic parameter pipelines warrants as opposed to having independent hardware for each individual computation.

One fact that should be pointed out is that with resource sharing, some overhead in terms of staging registers in the intermediate stages of pipelines is introduced. Therefore, the full benefits of resource sharing are not fully realized. A generic parameter pipeline also needs to accommodate the highest dynamic range and precision requirement of any parameter using the pipeline.

4.4 Depth Determination

Fragment depths in the raster/shading engine are not normally a consideration, however, there are two cases where the depth information is needed. The first case is for fogging, where either a screen-space z, or an eye-space z is required to look up the fog factor in the fog table. The second case is for transparency or any other case where the downstream system requires depth values for proper depth resolving.

In theory the depth values could have been passed from the scan/z engine to the raster/shading engine. In practice, this is a bad idea if the FIFO between the scan/z engine and the raster/shading engine is implemented through memory. This scenario is likely to happen because of the load balancing issues. A sizeable FIFO is needed even when using the tile-rendering-order re-shuffle algorithm. A simple calculation reveals that under a 1280×1024 screen resolution and a 30 hz frame rate, assuming 2 bytes per depth value, a memory bandwidth of:

2 (write/read)*30/s*(1280*1024) pixels*2 bytes/pixel=157 Mbytes/s is needed for transferring one screen full of transparency (a reasonable target to achieve in practice). This number quadruples under 4-sample multi-sampling. This is just too expensive.

Instead depths are recomputed in the raster engine. In fact, depths can be treated in virtually the same way as colors. The only difference is that depths have a larger range and precision requirement than colors. If generic fixed-point pipelines (for both primitive setup and fragment direct-compute) can not handle the precision requirement for depths, a generic floating-point pipeline can be used. In the latter case, set $1/w=1$ if only screen space z's are needed, or use the same $1/w$ required for perspective correction if eye space z's are needed. To avoid making the distinction between multi-sampling and A-buffer anti-aliasing, [z, dzdx, dzdy] is sent to the blending engine.

Z/Alpha-Blending/Pixel-Op Engine

The z/alpha-blending/pixel-op engine (hereafter the blending engine) is briefly described here. The blending engine is connected directly to the raster/shading engine through an internal data path on-chip. The blending engine in the invention uses a tile frame buffer on-chip. All frame buffer access is actually made with respect to this on-chip memory. When the processing of a tile completes, the engine resolves the final pixel colors based on the information stored in the tile frame buffer, and outputs colors to the color frame buffer in memory.

Note that depth information is not needed for opaque fragments under double-z. The fragments are painted directly on top of the background. For an opaque fragment, under multi-sampling, this means replacing the background color with the fragment color at the corresponding subsamples according to the coverage mask. Under A-buffer, this means setting the depth of a fragment to the farthest depth. This is correct because no visible fragments (either opaque or transparent) that are completely obscured by the visible opaque fragments are generated by the scan/z engine under double-z.

Figure 10:
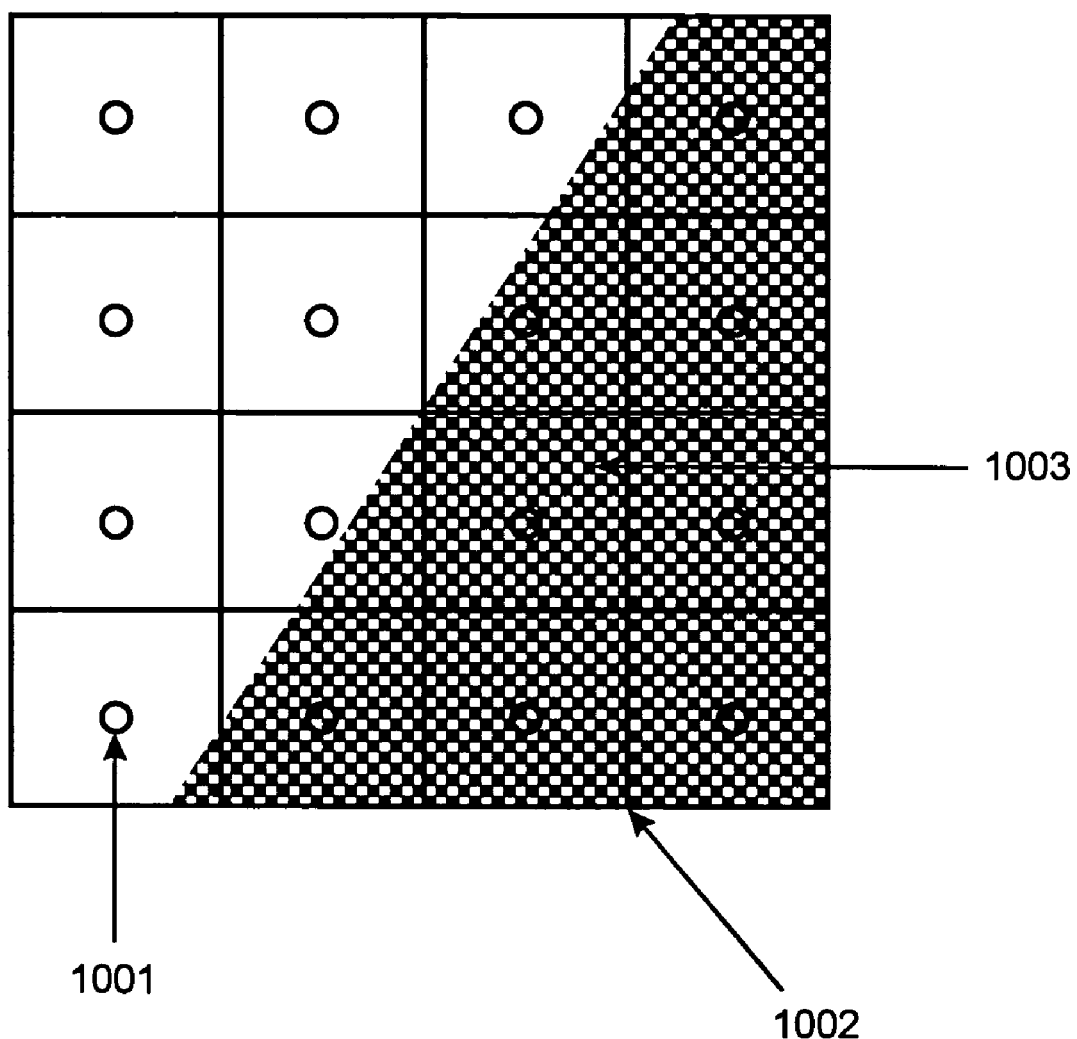
FIG. 10 is a schematic diagram of a subsample, pixel, and visible opaque fragment according to the invention.

Referring to FIG. 10, no subsample that is covered by a visible opaque fragment has a fragment 1003 contributing to the subsample color behind the opaque fragment 1003. Any other fragment generated for this subsample location is in front of the opaque fragment in the scan/z engine. Therefore it is acceptable to set the depth of this fragment to the farthest depth value without affecting the final correctness.

A depth buffer is needed in this engine to handle transparency correctly. There is really no restriction on what this depth buffer should be with respect to the depth buffer implementation chosen in the scan/z engine: In other words, they need not be the same. In fact, using multi-sample anti-aliasing in the scan/z engine and A-buffer anti-aliasing in the blending engine can be an interesting choice. It allows a very straightforward implementation in scan/z because it has to run very fast to load balance with other parts of the systems. By having an A-buffer in the blending engine, users are allowed to have unsorted transparency in their applications. Once again, the shading id bit can be used in the A-buffer to merge transparent fragments from abutting primitives underlying the same object in each pixel. Allowing fragment merging usually reduces the A-buffer depth by half without altering the anti-aliasing quality.

When multi-sample z-buffering is used for anti-aliasing, the users are required to sort their transparency back-to-front to achieve the desirable results. If the users are unwilling to do that, the blending engine behaves as a traditional blending engine and may blend transparent objects in the wrong order. One exception is when user applications use alpha textures with texel alpha values either 0's or 1's to model cut out shapes, and kill those fragments corresponding to zero alpha texel value in an alpha test prior to z-buffering. In that case, z-buffering is used correctly to determine the final visibility at each pixel. For multi-sampling, z is computed at the center of a pixel and dzdx, dzdy are used to derive subsample z values from the pixel center z value.

The color-resolving process after a tile's worth of geometries have been processed in the blending engine is fairly straightforward. The blending engine combines colors of all subsamples under multi-sample z-buffer anti-aliasing using a standard box filter to generate a final color for each pixel. Under fragment A-buffer anti-aliasing, it combines colors at all fragments at a pixel in either front-to-back or back-to-front order weighted by actual fragment coverage. Pixel colors are stored in the color frame buffer in memory after they have been resolved.

There are also cases when transparency is not involved and the depth buffer in the blending engine is needed. One such example is the stencil operation defined in OpenGL, which takes effect before the visibility computation. In this case, when stenciling is enabled, visibility computation in scan/z might not be valid any more. The scan/z engine can be used only as a fragment generator without performing visibility computation at all. The raster engine needs to compute the depth information, and the depth buffer logic in the blending engine can be used after stenciling to ensure the correct results are obtained in the blending engine.

The tile frame buffer in the blending engine needs to be cleared very quickly. A mechanism to perform fast clear of the on-chip memory is described below.

Implementation 6.1 Overview

Some implementation issues that are not addressed above are addressed here.

6.2 Synchronization Between the Screen Space Tiler and the Rendering Pipeline

Figure 11:
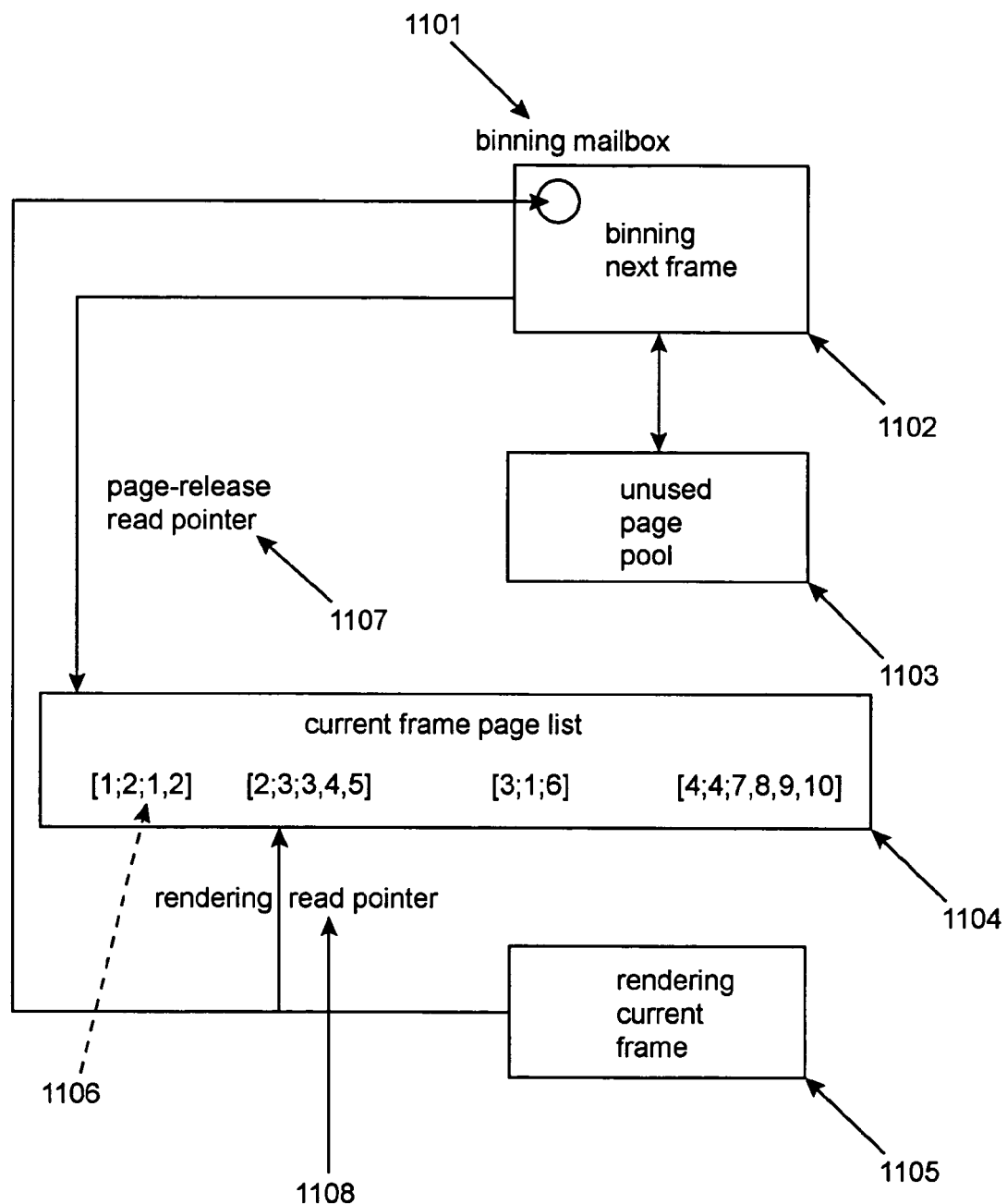
FIG. 11 is a block schematic diagram of the data flow of the page allocation/release synchronization in screen space tiling in a preferred embodiment of the invention.

Referring to FIG. 11, the screen space tiler bins screen geometries into corresponding tiles. Using the page-based single+buffering scheme described above, each tile contains a variable number of pages worth of geometries. At the end of a frame, binned geometries of all tiles can be described using a current frame page list 1104, which is a linear list of tuples of the form [tile_id, num_of_pages, a_list_of_pages]. Each tuple corresponds to the tile information required for rendering a tile. Here, the tuple [1;2;1,2] 1107 is the second tile, has two pages worth of binned geometries, and the page numbers are 1 and 2. The construction for the current frame page list 1104 is performed at the end of the frame very quickly, and the page list is stored at a pre-specified location in memory. Afterwards, the screen space tiler and the upstream geometry transformation engines start processing the next frame of geometries.

When the rendering of a previous frame is completed, the rendering pipeline handshakes with the screen space tiler 1102, and is informed of the current frame page list, and starts rendering the current frame 1105. The rendering pipeline maintains a rendering read pointer 1108 to keep track of which tiles and which pages have been read thus far, and therefore can be released back to the unused page pool. The rendering pipeline can use DMA engines to input binned geometries stored in the corresponding memory pages for rendering. Whenever a new tile (or at a finer level of granularity, a new page) has been completed rendering, the rendering pipeline sends a message to the mailbox 1101 of the screen space tiler 1102 informing the current position of rendering read pointer 1108. Note that the rendering read pointer 1108 and therefore the message is strictly increasing with respect to the current frame page list 1104.

The screen space tiler 1102 maintains a page-release read pointer 1107 initialized to the beginning of the current frame page list when binning for the next frame starts. The screen space tiler 1102 normally does not check or poll the mailbox 1101. However, when it needs new pages for binning geometries of next frame and finds that the unused pagepool 1103 is empty, it examines the most recent message in its mailbox 1101, and releases any pages between the page-release read pointer 1107 and the page corresponding to the latest message back into the unused page pool 1103 for page allocation of binning next frame. The page-release read pointer 1107 is then updated to the message value. Here, the fact that the rendering read pointer is always increasing is taken advantage of. This process continues until the current frame is rendered.

To construct the current frame page list 1104, the page list needs to be double buffered to avoid overwriting the page list contents corresponding to the previous frame that the rendering pipeline is using. Alternatively, the construction can happen after the previous frame is fully rendered. The latter might be reasonable because the construction can be done very quickly. If a large FIFO is used to load balance between the scan/z engine and the raster/shading/blending engine, the current frame page list is filled with the tile information (already available for each tile after binning is done) ordered from the first tile to the last tile. If the tile-rendering-order re-shuffle algorithm as described earlier is used to load balance between the scan/z engine and the raster/shading/blending engine, the accumulated tile information needs to be scanned twice (classifying in two group first, matching groups second) to come up with the tile rendering order, and then fill the current frame page list. Even the second scheme is very efficient to implement.

The mailbox and page release mechanism can be incorporated at the upstream hardware to reduce the complexity of the screen space tiler.

6.3 Input to the Scan/z Engine

The scan/z engine needs to read the screen x, y, z coordinates of primitives tagged by vertex connectivity (twice for opaque geometries or once for potentially transparent geometries) to generate visibility information. However, the naive implementation of SST just embeds screen x, y, z coordinates in the screen geometry information that contains all other surface parameters. If all of the screen geometry information has to be read before screen x, y, z coordinates are extracted, and worse yet, possibly twice, a large amount of memory bandwidth is wasted.

Figure 12:
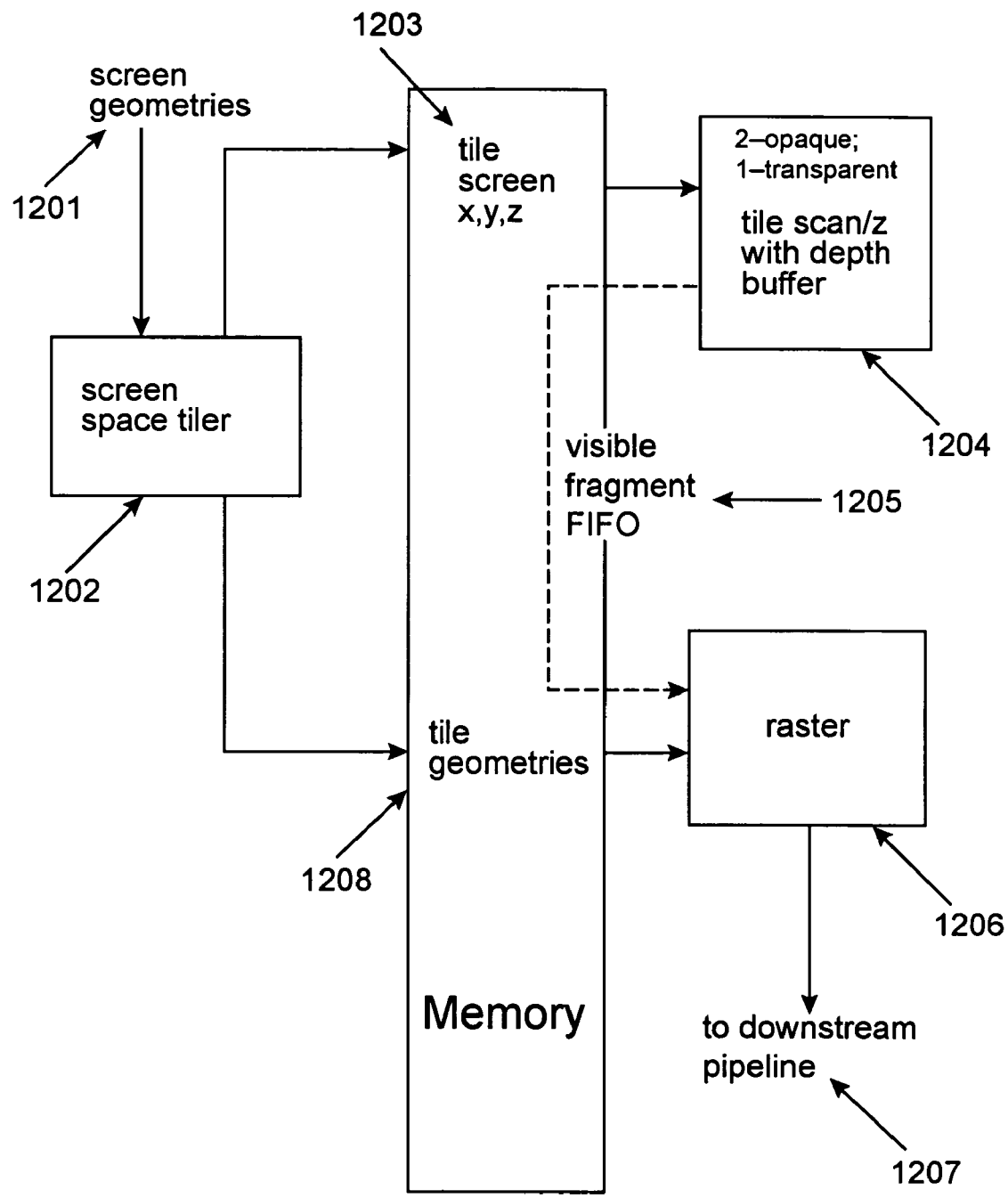
FIG. 12 is a block schematic diagram of the module communications in a preferred embodiment of the invention.

With respect to FIG. 12, alternatively, a separate copy of screen x, y, z coordinates of all primitives tagged by vertex connectivity is kept 1203 (called the screen x, y, z stream) in addition to the screen geometry information 1208. Also included in this screen x, y, z stream 1203, is mode information related to scan conversion and depth operations. Then the screen x, y, z stream 1203 is used in the scan/z engine 1204. The memory bandwidth requirement is substantially reduced under this method. The drawback is that more memory is needed to hold the screen x, y, z stream 1203. Fortunately, 7 bytes suffice to represent screen x, y, z coordinates per vertex plus vertex connectivity information. This method thus adds a potential 30% premium in terms of buffering size for binning over the naive way. To avoid the extra overhead, screen x, y, z coordinates are separated from the rest of the surface parameters. Only surface parameters other than screen x, y, z coordinates are in the screen geometry 1201 information. There is no net increase in terms of buffering size for binning. In return, screen x, y, z coordinates for the visible primitives are added to the visibility information out of the scan/z engine. Either way requires separate buffering for screen x, y, z stream 1203 and screen geometry 1208 information.

Yet another alternative is to provide a memory controller in the scan/z engine that skips surface parameters other than screen x, y, z coordinates. The difficulty with this approach is that vertices are already in packed formats, which disallows very fine-grained component skipping, and the memory controller design itself is probably too complicated.

6.4 Synchronization Between Visibility Information and Screen Geometry Information at the Input Interface of Raster/Shading Engine.

The factors when considering interface design are:

1) What is the memory bandwidth requirement?

2) Is there significant inefficiency at an interface?

The input to the raster/shading engine consists of two streams. The first stream is the screen geometry information (via memory), and the second stream is the visibility information (from the scan/z engine). The input interface tries to identify the primitives in the screen geometry stream required to rasterize and shade visible fragments. There is one staging FIFO for each of these two streams to prefetch data, and to compensate potential burstiness of data.

The visibility stream consists primarily of visible fragments, visibility information for primitives, as well as potentially some synchronization information. A fragment is represented as an [x,y] location in addition to the pixel coverage mask. To make the representation more compact as well as taking advantage of forward differencing to some extent in the per-fragment raster computation, visible fragments of adjacent pixels are packed together to form a fragment group when the second-pass of double-z for a primitive is done. Visibility information for primitives is in the form of a vertex id preceding the visible fragments that this vertex triggers the generation of.

The geometry stream consists primarily of geometry vertices with all surface parameters, in addition to potentially some synchronization information. Extra tags can be associated with vertices to indicate the primitives type, and connectivity information. A reasonable assumption is that the vertex size stays constant most of the time. Switching among flat shading, Gouraud shading, and Phong shading, turning on/off texturing, switching from the single texture to multiple textures, or vice versa potentially changes vertex size, although the most redundant representation can be used (by including all possible surface parameters).

Mode information for raster/shading/blending is also something that has to be conveyed properly. Here are some alternatives that give different levels of efficiency and control complexity based on how the visibility stream is synchronized with a geometry stream.

The first alternative requires the decoder at the screen geometry stream side to be identical to the one at the scan/z engine in terms of interpreting primitives. The decoder at the geometry side is then able to recreate the exact scenario which vertices/primitives generate which visible fragments by corresponding the vertex id from the visibility stream with the current vertex id in the geometry decoder. The geometries that generate no visible fragments are discarded.

All modes are embedded in the geometry stream. The visibility stream does not contain mode information.

This scheme is fairly straightforward implementation-wise. However, it has serious drawbacks. First, all geometries have to be input because the geometry decoder has to decode everything before it can tell if a piece geometry is visible or not. Second, deferred mode binding might be difficult to implement in the raster/shading engine because a bind might have long been carried out before we realize no geometry under this mode binding is visible. Third and perhaps the most problematic of all, because there is only limited FIFOing at the geometry side, the invisible geometries are always read and can easily stall the raster/shading processing, even though there are visible fragments to be processed in the FIFO for the visibility stream. This case happens a lot when raster/shading-after-z is adopted. Ideally, only visible geometries are read in the geometry FIFO to avoid this case.

The second alternative puts all synchronization information in the visibility stream. The geometry stream merely contains all vertex information without knowing the concepts of primitives or modes. The visibility stream contains not only visible fragments and primitive visibility information, but also mode information and vertex connectivity information inside a primitive so that visible geometries can be reconstructed.

Another interesting item in the visibility information is a "skip-read" command which skips reading the next n vertices/bytes in the geometry stream, because the underlying primitive is completely invisible. This allows the memory controller to perform scatter reads (or skip reads) from the geometry stream stored in external memory, and consequently eliminate the problem of stalling the raster/shading unit when invisible geometries saturate the geometry stream FIFO. Substantial memory bandwidth is also saved because we do not waste time on reading invisible geometries.

The "skip-read" command is created in the scan/z engine because the scan/z engine gets all information (including the current vertex size). To make things easier, the granularity of the "skip-read" command is per-primitive based (i.e. either the whole primitive is skipped or not). A skip read command is issued if a primitive has not generated a single visible fragment during the 2nd pass of double-z. Consecutive invisible primitives are combined to generate a single "skip-read" command as long as there is no mode information in-between. Note that the complete connectivity information of a primitive is included in the visibility stream as long as some fragments of the primitive are visible. Under this circumstance, invisible triangles in a partially occluded primitive might still be read into the geometry stream FIFO. However, given that the FIFO size on the geometry stream side is adequate (e.g., 32 deep), the partial occlusion case rarely stalls the raster/shading engine.

The "skip-read" command can be per triangle so that a part of a primitive can be skipped at a time. This requires the scan/z engine to potentially keep track of much more state information during the process of a primitive. Considering that a typical strip/fan contains a very limited number of vertices within a tile, this might not be worthwhile.

Another advantage of sending all of the mode information to the scan/z engine is that deferred mode binding can be implemented in the scan/z engine based on whether there are any visible geometries under the new binding of a mode. In this case, only mode bindings for visible geometries comes into the raster/shading engine via the visibility stream.

6.5 On-Chip Fast Clear Implementation

As previously mentioned, there are many places involving fast clear of the on-chip tile buffers. This is difficult to do instantaneously, largely due to the number of cycles lost to clear the whole tile worth of buffer locations. It is possible to clear a tile buffer in a relatively few number of cycles by using wide registers and wide internal buses into on-chip memory. However, this might be too expensive.

One solution to this problem is to use a lazy evaluation scheme. For example, to clear the on-chip memory of 32×32 tile, instead of clearing the tile buffer right away, the large tile is partitioned into smaller blocks, say 32 blocks, where each block is of size 4×8. In addition, a block-clear-state register of 32 bits is added, where each bit in this register indicates whether the corresponding block of on-chip memory has been cleared: yes if set, no if reset.

When a fast clear command comes, only the block-clear-state register is cleared to reset for all bits. When the system actually tries to access contents inside a block, it first checks if the corresponding bit in the block-clear-state register is set or not. If it is, then proceed with the content access directly. Otherwise, first perform the actual block clear, and set the corresponding bit in the block-clear-state register. Then perform the content access.

The consequence of this scheme is that it incurs no clear freeze time when the tile buffer fast clear command is issued. Only when the clear is really needed to ensure proper semantics, e.g. when a block location is accessed, is the actual clear performed. Any actual clear for blocks that are not accessed need not be performed. This method thus takes advantages of local coherence.

Fragment-Merging A-Buffer Anti-Aliasing

Fragment-merging A-buffer anti-aliasing is a new way to do pixel anti-aliasing as opposed to the traditional means of achieving anti-aliasing through super-sampling. The invention uses a multilevel z and coverage-mask buffer (hereafter A-buffer) to derive pixel anti-aliasing in conjunction with fragment merging. The motivation of this work is to improve rendering quality while keeping the cost of anti-aliasing (in terms of both processing and memory requirement) relatively low. This method is particularly powerful combined with the double-z-sorting idea described earlier. One important assumption of this method is that in a typical scene, few pixels contain many visible fragments from multiple objects. As long as this assumption holds, this method gives the correct result. If there are more visible fragments from different objects in a pixel than the depth of A-buffer, then this method may generate an inexact final pixel color. However, this scenario rarely arises in practice. Even if it does, the front-most fragments in the A-buffer should give pretty reasonable color estimates for the offending pixels.

There is a n-deep A-buffer for each framebuffer pixel [x, y], where n is a constant. For a practical implementation, n=3 or 4. For each pixel [x, y], at each level i of the A-buffer, we have a tuple:

$$T[i]=[msk, z, dz, surface\_info]$$

where msk is the coverage-mask of a surface, z is the surface depth, dz is the surface z slope (51 |dzdx|+|dzdy|). In this document, all other information related to surfaces are abstracted in surface_info. For example, in a traditional graphics pipeline, surface_info can be the surface color. In a shading-after-z-buffering scheme, surface_info can contain the object ID, the surface attributes such as texture coordinates and normals. There is also an extra color buffer to accumulate colors. In the double-z-sorting architecture of the invention, surface_info includes the surface color. However, the color information is stored separately from the z and coverage-mask information to take advantage of shading after z-buffering. In addition, there is a shading id bit whose usefulness is discussed below.

For each pixel, T[*] are sorted in the order of increasing depths. In other words, surfaces closer to the viewpoint have smaller indices. Fragments from the same surface are merged by using [msk, z, dz, surface_info] to avoid waste of T[*] as well as reducing the number of fragments to be shaded as in the case of double-z-sorting. For i!=j, the configuration of T[i] need not be the same as that of T[j]. This flexibility allows the tradeoff of quality for memory. For example, coarser-resolution coverage masks and surface colors are used for larger T indices, e.g. 24-bit colors for i=0, 1 and 16-bit colors for i=2, 3.

Define |z, dz| to be the interval of [z−dz*.5, z+dz*.5], and overlap(|z1, dz1|, |z2, dz2|) is true if |z1, dz1| overlaps with |z2, dz2| in terms of depth range (ie, z1+dz1*.5>=z2−dz2*.5 and z2+dz2*.5>=z1−dz1*.5). Assume that z's are sampled at the center of a pixel, and dz=|dzdx|+|dzdy|. Finally, assume that the input of our anti-aliasing algorithm is the pixel location [x, y] along with the input fragment S[msk, z, dz, surface_info]. Initially, all of T[*][z] are set to zfar, and T[*][dz] are set to 0. The anti-aliasing scheme works as follow:

```
function antialias(S, [x, y]) {
    /* find corresponding T[*] to [x, y] */
    find([x, y], T[*]);
    for ( i=0; i<n ; i++) {
        is_overlap = overlap(|T[i][z],T[i][dz]|, |S[z],S[dz]|);
        if (! is_overlap && S[z] >= T[i][z])
            /* S is behind T[i], and does not overlap with T[i] */
            continue;
        if (! is_overlap) {
            /*
             * S does not overlap with T[i], and is in front of T[i]
             * do replacement
             */
            goto do_replace;
        }
        /* S overlaps with T[i] */
        if (! mergeable(T[i], S)) {
            /* S cannot be merged with T[i], do replacement instead */
            goto do_replace; }
        /* merge S with T[i] */
        merge(T[i], S, T[i]);
        return;
    }
    /* behind everyone, return */
    return;
do_replace:
    /*
     * replace T[n−1] with T[n−2], . . . , T[i+1] with T[i], and T[i] with S
     */
    chain_replace(S, T[i . . . n−1]);
}
```

The chain_replace function throws away the last entry T[n−1], and set T[n−1 . . . i+1]<==T[n−2 . . . i] and T[i] <==S. Different alternatives for merge( ) and mergeable( ) are presented later. The main objects of our algorithm are:

Object
1) Achieve anti-aliasing with relatively low costs.
2) Do anti-aliasing without requiring sorting at the API level.
3) Draw abutting polygons properly without creating color anomalies (e.g., cracks). This is critical because polygons are becoming smaller and smaller, and frequently there are neighboring fragments from abutting polygons within a single pixel.
4) Handle the case when a partially-covered (silhouette) fragment lies in front of a fully covered fragment, which is the most important place for proper antialiasing in practice.

Analyzing how the above objectives are accomplished using the present algorithm Object 2) can be accomplished with this algorithm. Object 3) is accomplished using the overlap( ), mergeable( ), merge( ) operators. While the overlap( ) check opens the possibility of false surface merging when two fragments from different surfaces are merged, because these two fragments are close by, and at least one of them has a high z slope, the mergeable( ) check is used to prevent this scenario. For example, in a traditional graphics architecture, the colors of two fragments are compared to decide if they are mergeable. In a shading after z-buffer approach, fragment merging is performed if the object IDs are identical and the surface attributes are similar. In the double-z-sorting scheme, mergeable( ) is based on if the one-bit shading IDs are identical or not. The merge( ) function is performed simply by merging the coverage masks in each of these cases. There might be some advantage of recomputing the z of the merged fragment as well. However, the determination of dz becomes more problematic.

A potential problem of this algorithm occurs when there are more than n partially covered surface fragments for a pixel before hitting a fully covered opaque fragment. When this case occurs, certain samples of this pixel might be left uncovered because of the limit of A-buffer depth, when in reality it should be. An alternative is to make the last entry T[n−1] special so that it has to be fully-covered. Another solution of a different flavor is to check the "and" mask of a surface coverage mask and the "complement" of the "or" mask of surfaces in front of it. If the net "and" mask is 0, this surface fragment is discarded. This method eliminates the potential noncontributing partially covered fragments. Yet another alternative is to keep "or"-ing with the coverage mask of T[n−1] if a new fragment is behind T[n−1]. This scheme effectively overweighs the last fragment in terms of color contribution to the final pixel. Because the aforementioned scenario of trouble does not occur often in practice for a reasonable n (eg, n=3), it may not matter which scheme is used. However, if for economic reasons, n=2, the coverage determination becomes more important. Observe that claim 4) can be accomplished even when n=2.

Comparing the cost tradeoffs between supersampling and the fragment-merging A-buffer method under a traditional graphics pipeline, there are three cases to consider. When the number of multi-samples is small (n=1 or 2), supersampling is easier to implement and more efficient but of poorer quality, whereas the A-buffer method is of higher quality (assuming there are large enough coverage masks). In the case of n=8, 16, supersampling is more computationally intensive, and of higher quality, whereas the A-buffer method with n=3 or 4 requires less computation, provides comparable quality under most circumstances, but may do worse occasionally. When n=4, these two methods are probably comparable computation-wise. The A-buffer method may offer somewhat better quality if coverage masks are more than 4 bits, but multi-sampling might be easier to implement in hardware.

In terms of memory requirement, for 4 samples per pixel, and 24-bit z per sample super-sampling without considering colors requires:

4*3 bytes/sample=12 bytes/pixel $\overbrace{\phantom{xxxxx}}$
z whereas a 3-level A-buffer scheme with 20-bit z, 6-bit dz, and 6-bit coverage per level requires:

3*4 bytes/level=12 bytes/pixel.

$\overbrace{\phantom{xxxxx}}$
z,dz,msk

These look fairly comparable. However, when 8-sample per pixel sampling is considered, the memory requirement for super-sampling is 24 bytes/pixel, whereas the A-buffer method requires 15 bytes/pixel. Still the advantages of the A-buffer scheme is not as compelling as desired, considering the extra complexity introduced. This is where double-z-sorting with fragment merging comes for the rescue.

Clearly, without double-z-sorting, too many fragments that end up overwritten by new fragments are shaded. With double-z-sorting in conjunction with fragment merging, however, the per-pixel shading computation is reduced to slightly over one fragment per pixel.

The first pass of double-z-sorting uses exactly the same procedure as antialias( ). The main function for the second pass in a function called shadeable( ). This function determines if a particular fragment should be shaded. If it should, how much coverage should it get and which level of A-buffer it is at. Note that there is no re-initialization of the A-buffer between the completion of the first pass and the beginning of the second pass. A variation of this is to add a shaded bit at each depth so that it can be determined if a particular depth has already been considered. Then a fast bit clear is needed. Obscure( ) determines if a number of fragments collectively obscure another fragment.

```
function shadeable(S, [x, y]) {
    /* find corresponding T[*] to [x, y] */
    find([x, y], T[*]);
    for ( i=0; i<n ; i++) {
        /* check if S is the "same" as T[i] */
        if (S[z] == T[i][z] && S[dz] == T[i][dz]) {
            if (obscure(T[0 . . . i–1][msk], T[i][msk]))
                /*
                 * if the fragments in front of T[i] obscure
                 * T[i] completely, no need to shade S
                 */
                return [FALSE, 0, 0];
                /*
                 * otherwise, S is partially visible, shade it and give
                 * its T[i] coverage
                 */
                return [TRUE, T[i][msk], i];
        }
    }
    /* need not shade this one */
    return [FALSE, 0, 0];
}
```

Using antialias( ) for the first pass, there are at most n surface fragments for each pixel. Using shadeable( ) for the second pass, essentially only shades these surface fragments in the A-buffer that are not obscured by other fragments in front of them. One potential problem is when there are co-planar polygons and not only coincident z's, but also coincident dz's exist. The wrong order and coverage mask may result if care is not taken. However, as long as is handled consistently between antialias( ) and shadeable( ), the result is correct. However, using the above argument, the shading of n fragments per pixel may have to be done. In fact, this is likely to be the case if fragment merging is not used.

The expected graphics performance is becoming so high that the average polygon size declines steadily. In the near future, an average polygon size of 10 to 25 pixels will become the norm. However, the overall surface size remains more or less the same (except some difference at the silhouettes). The end-result is that there is a large percentage of pixels that contain multiple abutting polygon fragments from the same surface. Collectively, these fragments form a full coverage of each of these 2 pixels. Without fragment merging, each of these multiple fragments takes a separate level in the A-buffer, and are shaded independently. An even worse scenario is that they may not fully cover the pixel collectively due to the limited depth of A-buffer. The solution is to merge all of these abutting fragments to form a combined fragment (where the name of fragment merging comes from), shade this combined fragment only, and use the combined coverage mask for blending among different surfaces. This is reasonable because in practice, the shading results from these abutting fragments from the same surface are extremely similar within a pixel as long as they have the same surface under a continuous shading function.

The shading rate drops to slightly over one fragment per pixel using fragment merging and double-z. Basically this is an accounting argument: how many pixels are interior pixels (which do not have any front-most partially covered fragments) and how many of them are silhouette pixels (which have front-most partially covered fragments). For interior pixels, level 0 of the A-buffer contains only fully-covered fragments after fragment merging. However, for silhouette pixels, fully-covered fragments do not appear until level 1 or level 2 of the A-buffer. Still, the percentage of silhouette pixels is quite small (under 20% even under extreme situations) and the number of silhouette pixels stays constant as long as the shape of the object stays relatively intact regardless what the average polygon size is at most 1.2 fragments per pixel needs shading using fragment merging. Note the above argument is no longer valid if each polygon is treated as a single surface, where the percentage of silhouette pixels climbs to more than 70% for an average polygon size of 25 pixels. The difference here is that even as people model objects with finer and finer details, the percentage of interior pixels stays pretty much constant. The implication is that regardless what the average polygon size is, the number of fragments required to be shaded remains relatively constant with fragment merging.

Fragment merging is only reasonable for fragments coming from the same surface and sharing similar shading. Therefore, it is critical to be able to tell if fragments are from the same surface and give similar shading results. Note that |z, dz| intervals are used to decide if two fragments overlap in z's. Therefore, if the |z, dz| test certifies two fragments overlap in z's, then declare that these two fragments can be merged. This works as long as there is no inter-penetration between different surfaces in the scene and the shading function is continuous for the same surface.

However, in a typical graphics database, there are some violations. For example, a box with different textures attached to its sides has this problem. Aliasing artifacts are introduced when fragment merging is performed at the intersecting pixels. The function mergeable( ) avoids this problem. In the case of shading after z-buffering, the object IDs are used to decide if two fragments come from the same surface, and surface attributes are used to determine if these fragments share similar shading functions. In double-z-sorting, this is more difficult because other surface information is not stored at the A-buffer. This brings in the concept of shading id.

Each new shading id indicates a shading discontinuity, i.e. any change that can make new shading computation discontinuous from old shading computation. For example, a new texture bind requires a shading id change, as does a material or a light change. Just as importantly, coincident vertices having different colors or normals should incur a shading id change as well. One type of shading id implementation requires a shading id bit per depth of the A-buffer. It also demands fast-bit clear hardware. After a shading change has taken place, the fast-bit clear is used to clear shading id bits at all depths to 0's. Then geometries encountered until the next shading change assume a shading id bit of 1's. Only fragments with shading id bits that are both 1's can be combined. Coupled with the overlap( ) test, two overlapping fragments coming from the same surface and having the same shading function are detected and merged.

The shading id change is conveyed to the hardware by a high-level API. In general, whenever there is a mode change of the rendering state, the shading id should be changed. In addition, whenever there is a discontinuity in terms of surface attributes that can cause the shading function to change dramatically within a pixel, the shading id changes as well. Coincident vertices having different normals, colors, texture coordinates are good candidates. A reasonable way to detect them under retained mode rendering is to build a mesher that tries to mesh all polygonal vertices of an object into a winged-edge surface without any redundancy (doing this can also reduce rendering costs). If this can be done, then there is no surface attribute discontinuity. Otherwise, coincident vertices having different surface attributes are likely to be found.

Some minor cases might break this scheme. If user programs for whatever reasons do not take advantage of spatial and shading coherence, the rendering performance suffers even if the herein disclosed schemes are used. The efficiency of this scheme relies on the fact that neighboring fragments from the same surface and having similar shading are processed next to each other. The offending scenario is much less likely now however because typical modern graphics databases are created in a hierarchical fashion. Larger shading ids (say 8-bit) can also be considered.

If the inter-penetrating objects use exactly the same shading function, then strictly speaking, this schemes does not give completely correct results at the intersecting pixels if no shading id change takes place between objects. One way to resolve this is to enforce a shading id change for different surfaces.

Similarly, self intersecting objects can cause problems as well. A reasonable solution to this is to apply back-face culling.

With some modifications, double-z-sorting can significantly reduce the costs of multi-sampling antialiasing as well.

Fixed-Point Arithmetic for Geometric Processing through Differencing Coding and Transformation Factorization Analysis Differencing transformation and transformation factorization analysis are described below. Traditionally, geometry processing in graphics applications is performed using floating-point arithmetic. Since floating-point arithmetic requires much more hardware to implement than fixed-point arithmetic, they are calculated in fixed-point arithmetic instead. Unfortunately, these attempts generally were not successful. One previous attempt was to use very large fixed-point adders/multipliers. However, doing that is not better than (if not worse) than using regular floating-point arithmetic in terms of hardware complexity.

There are two stumbling blocks for reducing hardware complexity through fixed-point arithmetic. One is because most graphics designs use the geometry processing to do rasterization setup. If only limited-precision (say 32 bits) fixed-point arithmetic is used to do rasterization setup, it becomes problematic when things such as skinny triangles come up. However, if there is specialized hardware that is dedicated for rasterization, this no longer becomes an issue as far as geometry processing is concerned. With the reduced functional requirements, geometry processing is substantially limited to geometry transformation, normal transformation, texture coordinate generation and transformation, lighting, possibly clipping, and then mostly CPU (integer-oriented) operations (e.g., polygon decomposition). Of these operations, the only ones that require floating-point operations are geometry processing and clipping. People have been able to get by geometry processing without doing clipping. So the real problem is geometry transformation.

Why is it necessary to keep some notion of floating-point arithmetic in geometry processing? One obvious reason is at the API level. In a typical database, floating-point numbers are used to represent things at different scales, through the use of an exponent. With this exponent, objects as small as atoms, and as large as planets can be represented. However, if one resorts to a complete fixed-point representation without the notion of an exponent, one loses the flexibility of modeling different scales.

On a related note, because this is a dynamic environment and the scale of typical scene database is getting larger and larger, if the viewer moves, or the objects move, the relationship between the viewer and the objects can change dramatically. There has to be some notion of floating-point numbers to capture this relationship. It is clear that there is a need for some-kind of floating-point arithmetic for geometry processing. However, this does not at all mean that considering fixed-point arithmetic for geometry processing is a bad idea. Something that is almost as good as fixed-point arithmetic alone is to cleanly divide the workload between fixed-point arithmetic and floating-point arithmetic. If the percentage of workload for fixed-point arithmetic predominates that of floating-point, then it is not that bad of a deal. It is quite straightforward to simulate floating-point arithmetic using double fixed-point arithmetic (and consequently take a 4-5× performance hit). However, this is not going to affect the overall performance of geometry processing in a serious way if the work required for floating-point (or double fixed-point) is infrequent. Considering the fact that a substantial amount of hardware can be saved because of fixed-point arithmetic nearly exclusively (as well as a minor amount of simulated floating-point arithmetics), this approach may be preferred.

Figure 13:
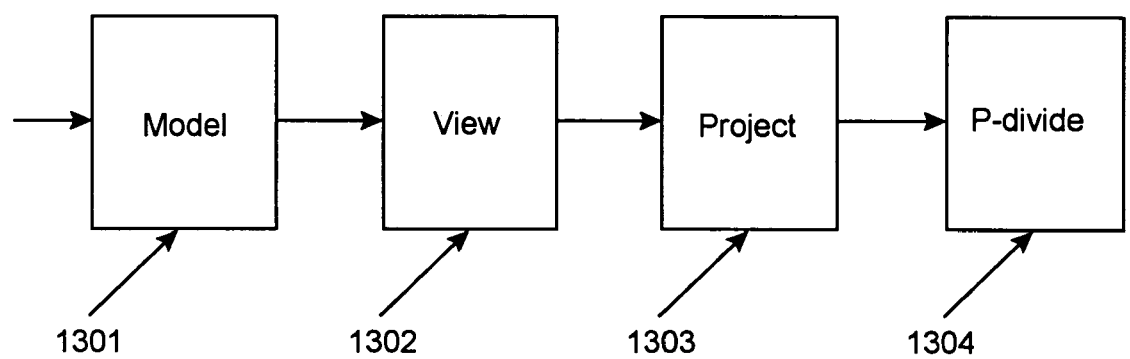
FIG. 13 is a block schematic diagram of the data flow involved in geometry transformation in a preferred embodiment of the invention.

Referring to FIG. 13, consider what is involved in geometry transformation. A standard approach is to transform a point v with a model matrix M 1301, a viewport matrix V 1302, a projection matrix P 1303, and then do a perspective divide 1304. There is actually a viewport transform after the perspective divide phase. Because everything is in the range of [−1, 1] after the divide and the scale and translate for the viewport transform are all fixed-point numbers with relatively small magnitudes, this phase shall be ignored in this discussion.

$$vc = v\ MV\ P \quad (EQ\ 5)$$

$$vnx = vcx/vcw,\ vny = vcy/vcw,\ vnz = vcz/vcw$$

Note that in OpenGL, matrices M and V are combined as a single matrix (the product of M V).

Regardless, whether M, V are implemented as separate transforms, or M and V are combined into a single transform, under practically all applications both M and V are of the form:

$$\begin{bmatrix} a11 & a12 & a13 & 0 \\ a21 & a22 & a23 & 0 \\ a31 & a32 & a33 & 0 \\ a41 & a42 & a43 & 1 \end{bmatrix} \quad (EQ\ 6)$$

It is easy to verify that the product M V is still of the above form. In addition, unless one of the matrices M, V is degenerated due to a zero scaling, M, V, and M V are all of rank four. For the sake of discussion, only the product matrix M V is considered. If M and V are given separately, then they are multiplied together to get M V. The combined matrix is denoted MV.

Any matrix A can be uniquely decomposed into an orthonormal matrix Q and an lower triangular matrix L whose diagonal elements are positive elements or zeroes by using a factorization basically the same as the much more well-known Q-R factorization. If homogeneous points were written in column vectors, then Q-R factorization should be used.

$$A = QL \text{ where } Q \text{ is orthonormal, and} \quad (EQ\ 7)$$

$$L = \begin{bmatrix} r11 & 0 & 0 & 0 \\ r21 & r22 & 0 & 0 \\ r31 & r32 & r33 & 0 \\ r41 & r42 & r43 & r44 \end{bmatrix}$$

with $r11, r22, r33, r44 >= 0$.

Given the particular matrix A=MV is of rank four (non-singular) and MV is of the form in EQ5, the forms of Q and L are more specific.

$$Q = \begin{bmatrix} q11 & q12 & q13 & 0 \\ q21 & q22 & q23 & 0 \\ q31 & q32 & q33 & 0 \\ 0 & 0 & 0 & 1 \end{bmatrix} \text{ and} \quad (EQ\ 8)$$

$$L = \begin{bmatrix} r11 & 0 & 0 & 0 \\ r21 & r22 & 0 & 0 \\ r31 & r32 & r33 & 0 \\ r41 & r42 & r43 & 1 \end{bmatrix} (r11, r22, r33 > 0)$$

It is easily seen what each of these terms represents. Matrix Q corresponds to rotations or reflections. R11, r22, r33 correspond to scales, r21, r31, r32 correspond to shears, and r41, r42, r43 represent the translation involved from the model space into the eye space. Clearly, all terms in the orthonormal matrix Q are between [−1, 1], and they can easily be represented in fixed-point numbers and the corresponding transform shall be performed in fixed-point arithmetics as well. Typically, r11, r21, r22, r33, r32, r43 are of comparable magnitudes (in other words, they can be represented fixed-point numbers with a common exponent). R41, r42, r43 are the only numbers that actually have a substantial dynamic range difficult to squeeze the corresponding computations into limited fixed-point arithmetics.

Differencing coding helps in this situation. Let v=[x y z 1], and its transform after MV vmv. Considering v'=[x+dx y+dy z+dz 1]:

$$v'MV = v\ MV + [dx\ dy\ dz\ 0]MV \quad (EQ\ 9)$$
$$= vmv + dv\ MV$$

where $$dv = [dx\ dy\ dz\ 0]$$

However, due to the special form of dv (the homogeneous component is zero):

$$dv\ MV = dv\ Q\ L' = dv\ MV' \text{ where } MV' = Q\ L'$$

where $$L' = [r11\ \ 0\ \ \ 0\ \ \ 0] \quad (r11, r22, r33 > 0)$$
$$\phantom{L' =}[r21\ r22\ \ 0\ \ \ 0]$$
$$\phantom{L' =}[r31\ r32\ r33\ \ 0]$$
$$\phantom{L' =}[0\ \ \ 0\ \ \ 0\ \ \ 0]$$

This implies that MV'=Q L' can be represented in fixed-point arithmetics (plus a common exponent), and the corresponding transform can be accomplished in fixed-point arithmetics.

$$MV' = \begin{bmatrix} a11 & a12 & a13 & 0 \\ a21 & a22 & a23 & 0 \\ a31 & a32 & a33 & 0 \\ 0 & 0 & 0 & 0 \end{bmatrix} \quad (EQ\ 10)$$

This implies that as long as the 3×3 submatrix MV' of MV satisfies the fixed-point representation (plus a common exponent) requirement, to compute v' MV for each vertex v' of a block of vertices, v MV only needs to be computed in floating-point arithmetic for the first vertex of the block, v, and then the transform of the difference dv between other vertices with respect to v, dv MV' is computed. The sum of v MV and dv MV' is the same as v' MV.

$$v'MV = vMV + dv\ MV' \quad (EQ\ 11)$$

Because almost all geometries are modeled in some hierarchical fashion, consecutive vertices in the geometry processing streaming are extremely likely to be close-by vertices. This implies that the difference of model coordinates between the first vertex and other vertices is likely to be very small with respect to a common exponent. Dv is encoded in relatively few bits in fixed-point arithmetic (plus a common exponent). This further reduces the fixed-point arithmetic required to compute dv MV'. There can be a pre-specified fixed-point threshold to code the difference. When the difference exceeds the threshold, a new block is started, and the exceeding vertex becomes the first vertex of the new block.

What is demonstrated here is that model and view transforms can be performed using almost all fixed-point arithmetic. However, if the projection has to be performed in floating-point arithmetic, then all of the previous efforts would be lost.

$$P = \begin{bmatrix} p11 & p12 & p13 & p14 \\ p21 & p22 & p23 & p24 \\ p31 & p32 & p33 & p34 \\ p41 & p42 & p43 & p44 \end{bmatrix}$$

Fortunately, that is not the case under normal circumstances. There are basically two types of projections. One is orthographic projection, which is demonstrated through the fact that only p44 in the last column is non-zero. In that case, P is treated in exactly the same fashion as MV (note that P is of rank-four). In fact, we might as well multiply MV and P to get MVP, and play the differencing game by computing v MVP for only the first vertex of block, and calculating dv MVP' for every vertex else.

The second case is the perspective projection, demonstrated through the fact that only p34 is non-zero. Again, the differencing trick is used when considering the computation for dv MVP.

$$dv\ MVP = dv\ MVP = dv\ MV'P = dv\ MV'P' \text{ where} \quad (EQ\ 12)$$

$$P' = \begin{bmatrix} p11 & p12 & p13 & 0 \\ p21 & p22 & p23 & 0 \\ p31 & p32 & p33 & p34 \\ 0 & 0 & 0 & 0 \end{bmatrix}$$

Now suppose $$MVP = \begin{bmatrix} a11 & a12 & a13 & a14 \\ a21 & a22 & a23 & a24 \\ a31 & a32 & a33 & a34 \\ a41 & a42 & a43 & a44 \end{bmatrix} \text{ then} \quad (EQ\ 11)$$

$$MVP' = \begin{bmatrix} a11 & a12 & a13 & a14 \\ a21 & a22 & a23 & a24 \\ a31 & a32 & a33 & a34 \\ 0 & 0 & 0 & 0 \end{bmatrix}$$

By analysis similar to what was done for model and view transforms, all elements in aij ($0<=i<=2$, $1<=j<=3$) can be represented in fixed-point arithmetic plus a common exponent. Similarly, it can be proven that the efficient differencing coding for consecutive vertices in model space still applies here. Therefore:

$$v'MVP = v\ MVP + dv\ MVP' \quad (EQ\ 14)$$

where dv=[dx, dy, dz, 0].

The analysis actually allows either that only p44 is non-zero and p14, p24, p34 are zeroes, or that p44 is zero. Algebraically, it is possible to have other cases. However, they do not have any meaning in terms of projection.

Since perspective divides must still be done for the vertices to generate screen-space coordinates. This is the place where vn' should be represented in its full dynamic range. In other words, some sort of floating-point representation for transformed vertices is needed. There are still more optimizations. Only the vertices that are within the viewing frustum, or the vertices that are close-by the viewing frustum (to deal with clipping) are of any interest. Therefore, fixed-point arithmetic are made with respect to the viewing frustum. One way to accomplish this is to consider the range of w components (which reflect the z range of the viewing frustum). An enlarged viewing frustum can be used to deal with clipped geometries, which is also a way to reduce the clipping required. If clipping must be dealt with, then floating-point arithmetic may be considered for clipping. As long as the percentage of clipped polygons is low (which is completely possible through smart usages of scissoring), this is really not a bad idea.

It is quite possible to have a quality implementation of geometric processing using fixed-point arithmetic only. There are occasions when floating-point arithmetic is needed. However, those occasions happen at a much lower frequency compared to regular vertex processing (differencing transformation really in this context), and floating-point arithmetic can be simulated through the use of double fixed-point arithmetic.

Anti-Aliased Multipass Rendering

This section details two schemes to perform anti-aliased multi-pass rendering. One is more restrictive and requires no extra hardware, whereas the other is more general, requires a modest amount of hardware, and has a very low likelihood of getting noticeably incorrect results.

As explained in the double-z-buffering and rasterization sections, there is a good way to bound the number of partial fragments that need to be considered for fragment operations. Suppose a screen tile size has an area of /A/ pixels. Typically, the # of partial fragments rasterized (after z-buffering) per tile is close to /A/. To be on the safe side, assume the average worst case is 2/A/. However, the absolute worse case can be substantially worse than this. For example, each pixel may have many tiny partial visible fragments. Even if super-sampling anti-aliasing is performed, assuming 4 samples per pixel, the worst-case scenario requires 4/A/ visible fragments per tile. Perhaps, an even greater problem is when transparency must be dealt with. To this end, we may have even more visible fragments that contribute to the final colors.

There is no problem with having many visible fragments per tile if only single-pass rendering is considered. Trouble arises when the color contribution from multiple rendering passes for each fragment has to be merged. As explained above, a fine-grain rasterization scheme can be used, e.g. multiple-pass rendering on a per triangle basis. Because a triangle in a tile is generated at most /A/ pixels, an /A/-pixel buffer can accumulate-resolve post-z-ed pixels from each triangle. Unfortunately, there is a significant performance penalty to switch from one triangle to another triangle due to the resource switching required by difference passes. If only aliased rasterization has to be dealt with, then this /A/-pixel buffer approach can be used. However, when more than /A/ fragments introduced by either anti-aliasing or non-z-ed drawing must be considered, a couple of issues must be examined. First, it is useful to know what size is required to buffer intermediate results of multi-pass rendering. Second, the previously determined size might be impractical. In that case, either performance compromises or quality compromises, or both must be made.

Two schemes are presented. One is simpler but more restrictive, whereas the other one is more general, but somewhat more expensive.

Figure 14:
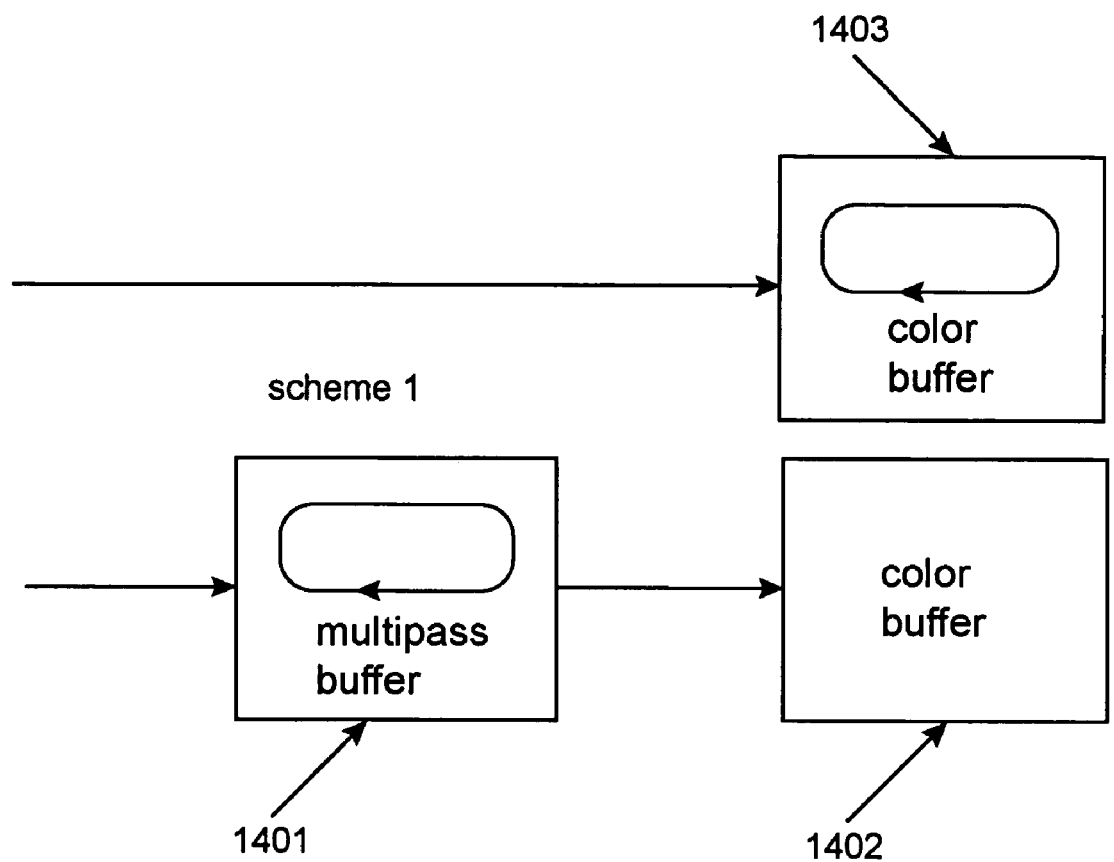
FIG. 14 is a block schematic diagram of two schemes for anti-aliased multipass rendering according to the invention.

With respect to FIG. 14, scheme 1 directly composites the color contribution of individual passes of fragments into the color buffer 1403, whereas scheme 2 first merges color contribution from all passes for each fragment into one color value 1401, and then composites it with whatever value in the corresponding color buffer location 1402. Clearly, the latter scheme always gives the desired result, whereas the first scheme has some problems to it. In general, fragment operations are not associative. For example:

$$c\_dst + (c\_src\_pass1^*.5 + c\_src\_pass2^*.5) \mathrel{!=}$$
$$(c\_dst + c\_src\_pass1)^*.5 + c\_src\_pass2^*.5$$

If each color buffer location sees only one fragment, then scheme 1 and scheme 2 should yield identical results. This is the case if double-z-buffering is used as well as multi-sampling for anti-aliasing, and all polygons are opaque. Another scenario that also works is when sorted transparent polygons are rendered after opaque polygons, and these transparent polygons require only single-pass rendering. This opacity requirement seems relatively restrictive in practice.

However, if the added complexity for scheme 2 becomes a concern, then scheme 1 is used.

In the case of scheme 2, there is a separate multipass buffer 1401 to accumulate and resolve color contribution from multiple passes for each fragment. Assuming the average worst case of the number of visible fragment per tile is 2/A/. However, the absolute worst case is 4/A/ for 4 samples per pixel multisampling. It might be worse if transparent polygons are dealt with. A large multipass buffer is not desirable because it substantially increases the premium of doing multipass rendering. One possible solution is to do fine-grain rasterization in terms of the # of primitives rendered into the multipass buffer at a time. However, as soon as the # of primitives is more than a couple, the buffer size corresponding to the worst-case scenario becomes too large in practice. An alternative is to have a reasonable-sized multipass buffer (say a size of 2/A/). As soon as the # of fragments in the multipass buffer reaches a high-water mask, rasterizing different primitives is stopped, instead multipass rendering is completed for whatever fragments that are already in the multipass buffer.

Unfortunately, interrupting rasterization introduces many software problems, breaks up the notion of data flow, and could turn into a design nightmare if there is a complicated pipeline from the entry of primitive rasterization to the multipass buffer (which is quite likely the case). While there are some problems with the above idea, it does lend some insight. Because the absolute worst-case scenario is unlikely to happen in practice, what is needed is something to get by this case rather than something to excel. As long as the scheme handles typical cases efficiently, it is acceptable. In fact, it can probably go one step further. When the worst-case scenario is encountered there is no need to do everything perfectly. As long as it does not cause significant visual problems, it is acceptable.

Figure 15:
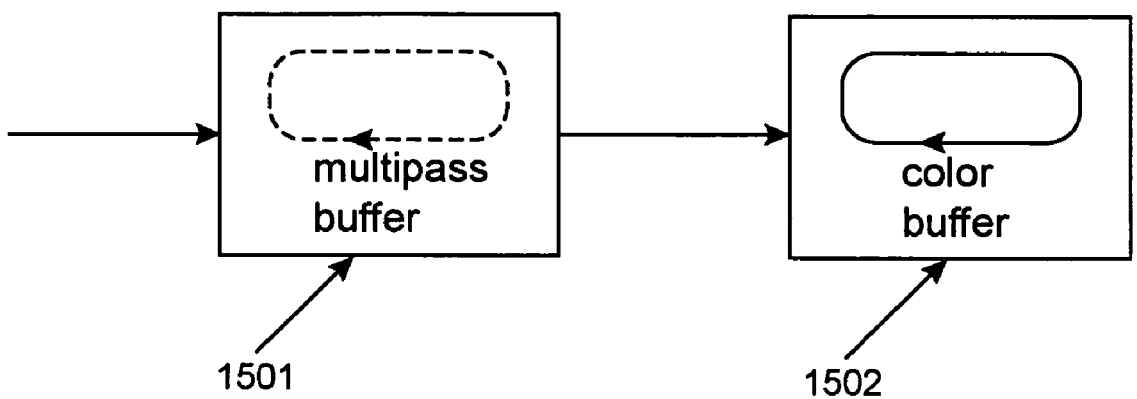
FIG. 15 is a block schematic diagram of the data flow of a revised scheme for anti-aliased multipass rendering according to the invention.

Referring to FIG. 15, a revised scheme 2' that is a blend of schemes 1 and 2 is presented. The difference of scheme 2' from scheme 2 is that whenever the # of fragments in the multipass buffer exceeds the buffer size, multi-pass merging in the multipass buffer 1501 is automatically turned off. Instead, the fragments stream into the color buffer 1502 and are composited there. In other words, if the worst-case scenario is not encountered, everything is done right. Otherwise, scheme 1 is resorted to. If there are so many visible fragments in a tile, it implies there are too many things going on inside this tile, users are less likely to detect per-pixel anomalies. If the visual quality on a per-fragment or per-pixel basis is lowered somewhat due to switching to scheme 1, it is not very noticeable. Important features of scheme 2' are that there is no feedback path to primitive rasterization, there is no extra burden on the software (different ordering of multipasses can make a quality difference, however, if switching does take place), and the data flow is strictly one-way (and therefore more efficient). In practice, it is probably sufficient to make the buffer size 2/A/.

Figure 16:
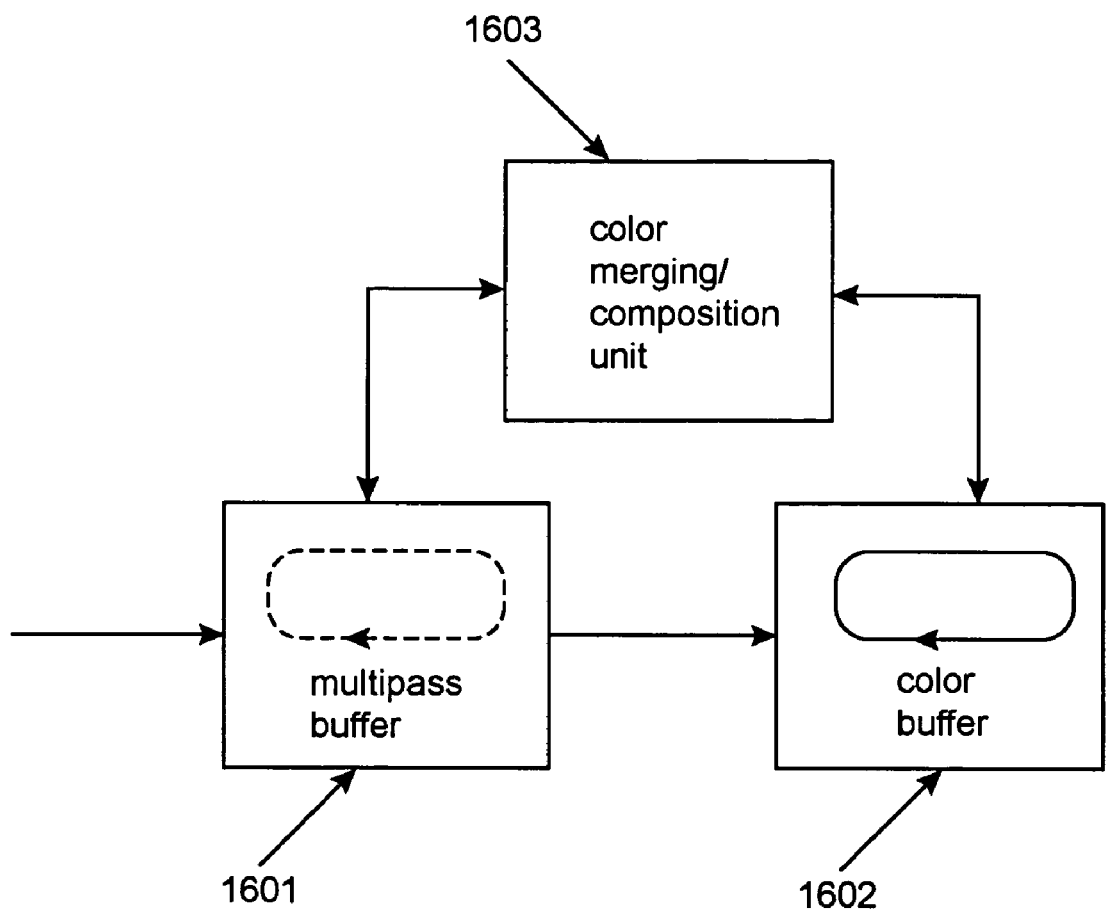
FIG. 16 is a block schematic diagram of the data flow of a further refined scheme for anti-aliased multipass rendering according to the invention.

With respect to FIG. 16, yet another improvement can be made. Because the color merging arithmetic in the multipass buffer 1601 are fairly similar to the color composition arithmetic in the color buffer 1602, and it rarely happens, if ever, that both arithmetic units are active at the same time, it makes sense to share the arithmetic unit for these two buffers 1603.

ADDITIONAL EMBODIMENTS

Some additional embodiments of the invention with regard to polygon rasterization are presented below.

Figure 17:
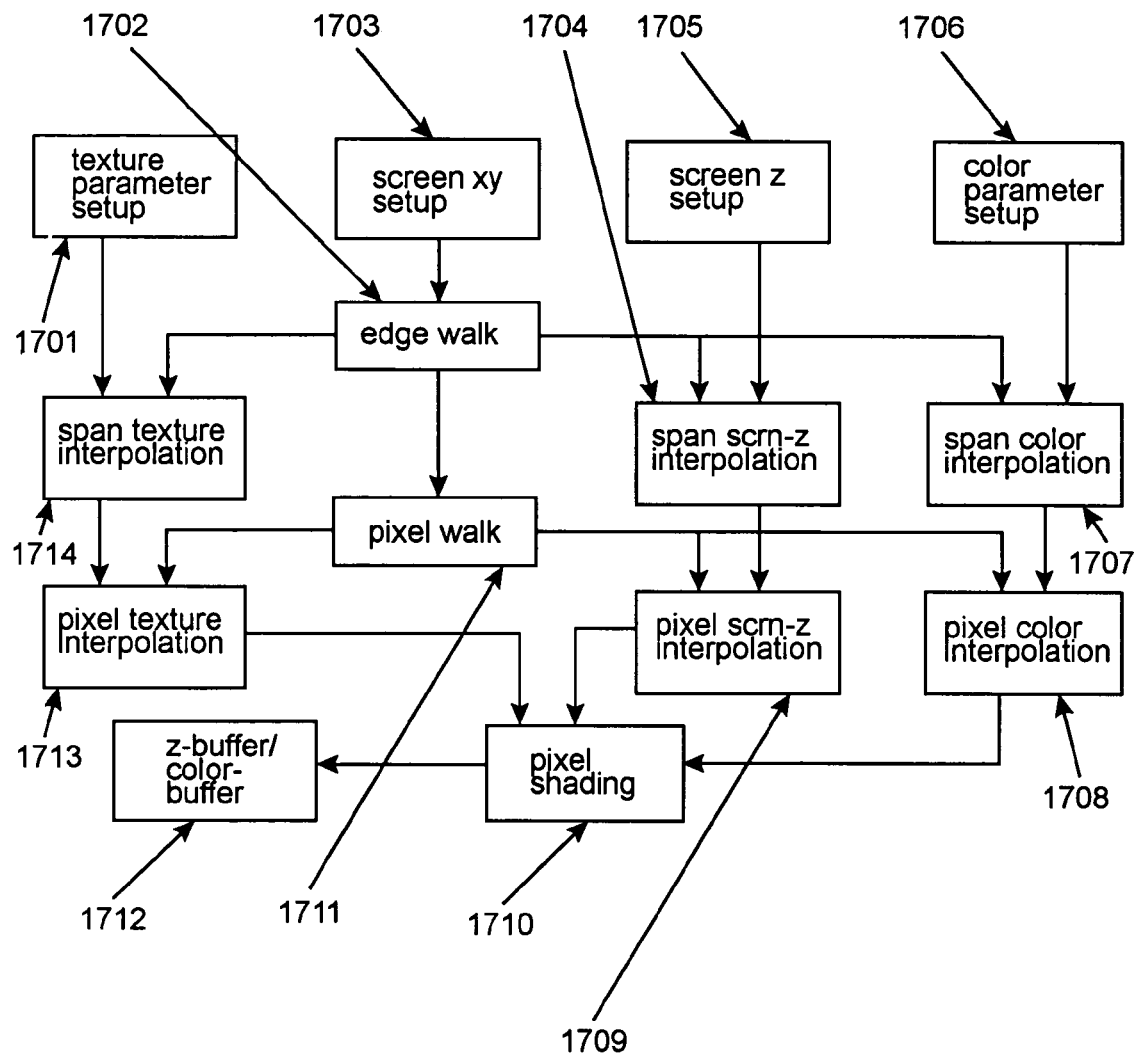
FIG. 17 is a block schematic diagram of the data flow of a traditional polygon rasterization engine according to the invention.

Referring to FIG. 17, with respect to each polygon, a traditional polygon rasterization engine first does scan conversion setup for all polygon parameters, such as screen coordinates 1703, 1705, colors 1706, and texture coordinates 1701 (normals if advanced pixel shading is desired). If the rasterization setup is done in hardwired logic, the set of scan conversion setup hardware is replicated for all parameters 1701, 1703, 1705, 1706. Second, a traditional polygon rasterization engine steps through all pixels belonging to the same polygon, and interpolates parameters on a per-pixel basis 1713, 1709, 1708. (An intermediate step of span interpolation 1714, 1704, 1707 can be added.) Here, the pixel interpolation hardware is generally replicated for all parameters 1714, 1709, 1708. Finally, based on per-pixel parameters, some kind of shading operation 1710 is performed. Currently, the standard graphics shading operation associated with each pixel can be enumerated as compositing texture-map-looked-up values based on texture coordinates, fog-table-looked-up values based on z-values, and Gouraud interpolated per-pixel colors.

However, there are some problems with this engine. First, there is a similarity among computations of screen z, colors, and textures. The only difference is as it is, texturing requires textures coordinates to be interpolated in texture space (linear with respect to eye space), whereas Gouraud-shaded colors and screen z are interpolated in screen space. It is in fact physically more correct to compute Gouraud-shaded colors in eye space. While screen space z is more advantageous in terms of fixed-precision z buffer, it is actually a better idea to do fog computation using eye space z. The replication of hardware for parameter computation of either polygon parameter setup or pixel parameter interpolation is very costly, considering that Gouraud-shaded pixel colors may not be needed at all when texturing is enabled. Therefore, it is likely to have more waste in terms of hardware costs when certain functionalities are not used.

Second, continuing the rasterization architecture of a traditional polygon machine also presents serious challenges to the extension of more advanced pixel-level shading. For example, having multiple textures per polygon becomes a serious concern. If a maximum of two textures per polygon is needed, then polygon setup/span interpolation/pixel interpolation of texture parameters have to be replicated twice. However, if a maximum of four textures per polygon is set, then the replication cost goes up by a factor of four. Note that in a typical scene, relatively few polygons actually need to be associated with four textures. However, the polygons that requires four textures force everyone else to pay for the cost of four textures per polygon to avoid taking performance penalties. This is an extremely inefficient way of using hardware.

Having realized the deficiency of current rasterization hardware, it is worthwhile to consider other alternatives. One possibility under consideration is to build a super-pipeline for polygon setup and pixel interpolation. In other words, rather than having separate hardware units for textures and colors, everything is done using a single super-pipeline, and there is no need for multiple texture units. Screen z's receive special treatment to take advantage of shading after z-buffering. By concentrating efforts on improving the performance of this pipeline, functional requirements of multiple textures and other advanced shading features through smart organization of hardware-assisted multi-pass rendering can be met. One rationale behind this thinking is that computations of all parameters of any triangle can be classified into two-categories, either screen-space based or eye-space based (there is a barycentric invariance in terms of triangle parameters between model-space, texture-space, and eye-space).

Strictly speaking, perspectively projected textures do not fit in either category. However, the fiddling of w components allows one to fake the corresponding texture computation in eye space. The only parameter that requires screen-space computation is the z's in the fixed-point z-buffer. By setting w=1, screen z values are obtained using our proposed pipeline. However, screen-z computation might not be the best place for saving costs due to the need of shading-after-z-buffering. Otherwise, every other parameter can be computed in eye-space. For example, eye-space z's can be calculated as indices to look up fog tables stored as textures. In other words, all polygon attributes (or parameters) can be treated in exactly the same fashion with the exception of screen z's. The above observation validates the idea of pushing for a single super-pipeline for computing per-pixel parameters. If data can be moved fast enough through this super-pipeline without starving the downstream hardware, then there is no need to replicate (nearly) identical hardware units. Only when the processing bandwidth of the pipeline becomes a bottleneck, is hardware replicating considered. Therefore, the new rasterization architecture is very attractive.

Figure 18:
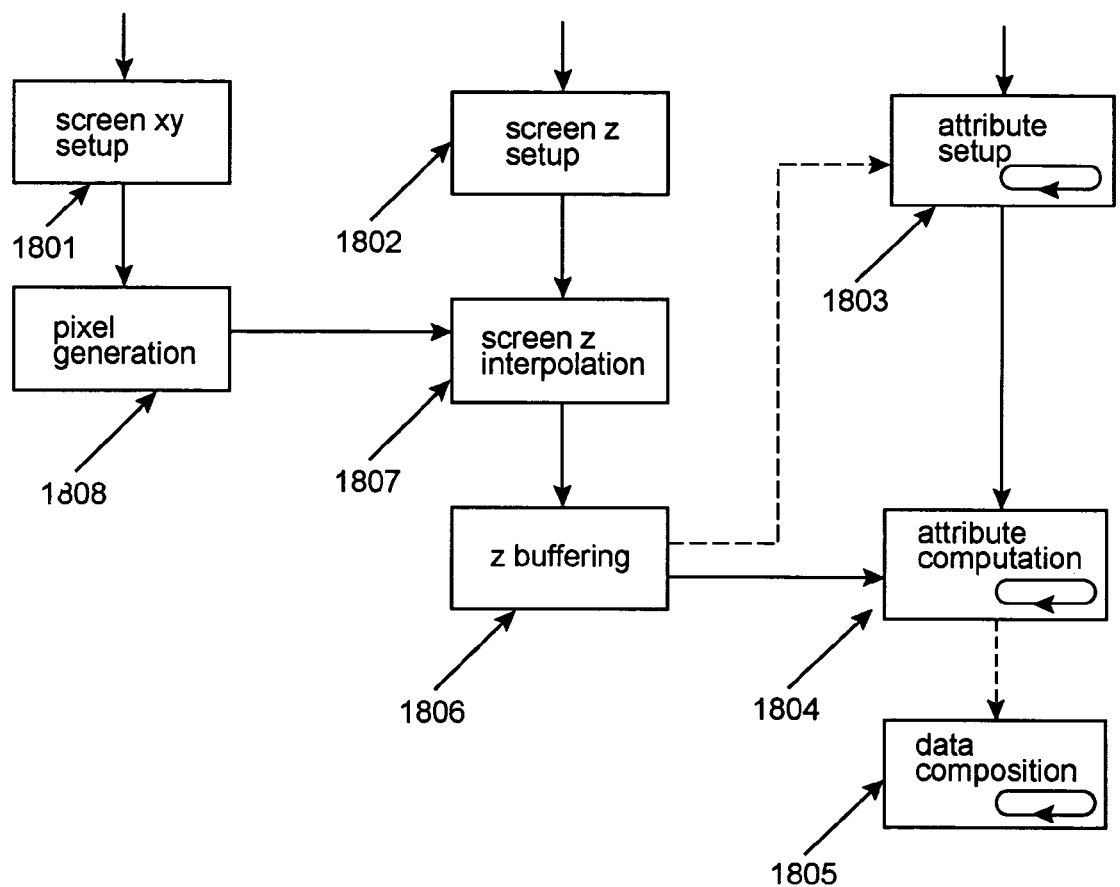
FIG. 18 is a block schematic diagram of the data flow of a decoupled rasterization engine in a preferred embodiment of the invention.

Referring to FIG. 18, the new proposed architecture decouples pixel-generation 1808/z-computation 1802 from computation of all other planar polygon parameters (through the use of z-buffering 1807). By applying certain schemes (e.g. the one specified in the double-z-buffering section), the system operates at a substantially lower frequency for computation of other attributes than screen-space z's. The implication is that much less hardware and more interesting functionalities can be achieved for the same level of pixel fill performance.

It is assumed that how to build a high-performance and reasonably efficient module for pixel-generation/z-computation (see the double-z-buffering section) based in part upon the disclosure herein is known. The construction of a fast super-pipeline for evaluating other planar polygon parameters is addressed. Having the same pipeline for evaluating all planar polygon parameters underlines the need to do multi-pass rendering, because any more parameters than what the pipeline can handle in a single pass has to be rendered in more than one pass. There are two types of multi-pass algorithms. One operates at a fine grain level, in this case, multiple: passes per triangle at a time, whereas the other operates at a much coarser grain level, e.g. one pass for several triangles at a time.

```
(1) fine-grained multipass
  for (each tri in bucket) {
      scan_convert_&_rasterize_z(tri);
      for (each attribute attrib of tri other than z)
          rasterize(tri, attrib)
  }
```

Figure 19:
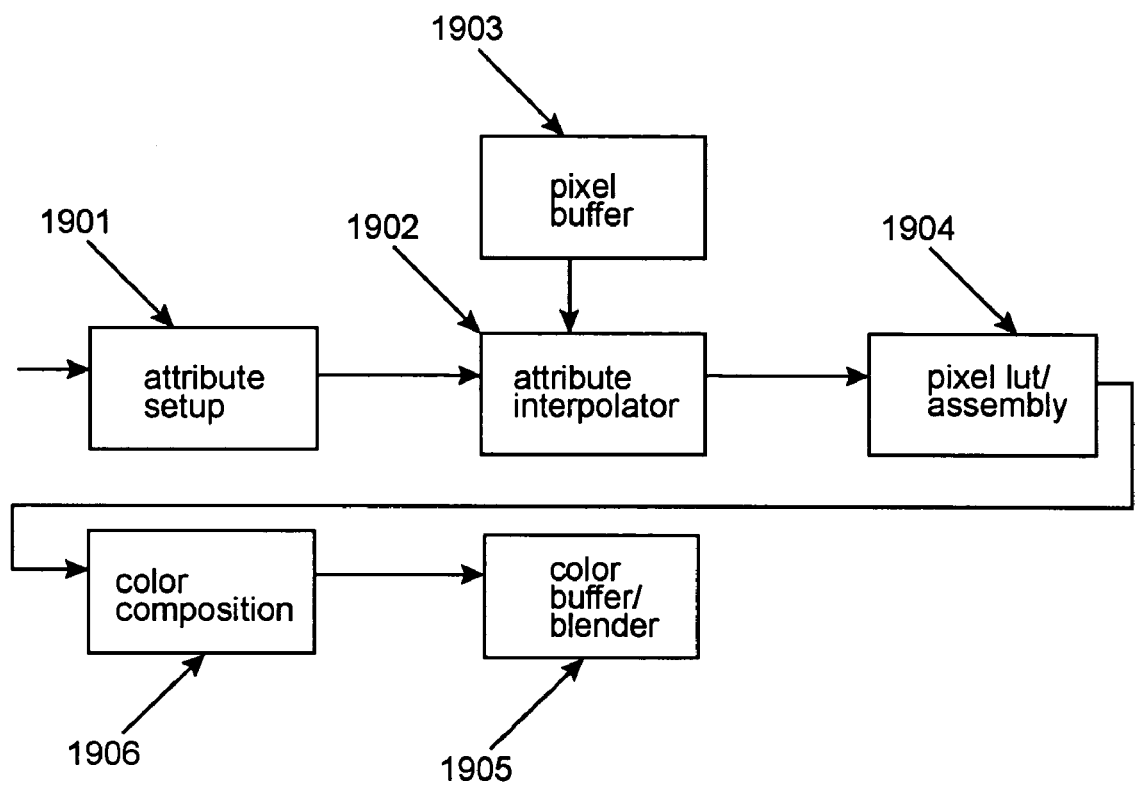
FIG. 19 is a block schematic diagram of the data flow of a fine-grain multipass rendering engine in a preferred embodiment of the invention.

With respect to FIG. 19, the fine-grain multipass algorithm contains an attribute setup module 1901. An attribute interpolator 1902, accesses the pixel buffer 1903. Output is sent to the pixel lut/assembly 1904. A color compositor 1906 is placed before the color buffer/blender 1905.

One interesting observation is that color compositor and color blender may share relatively similar functionalities.

```
(2) coarse-grained multipass
  while (more_triangles( )) {
      get(tris /* with the same number and type of attributes */);
      for (each attribute attrib of tris other than z) {
          scan_convert_&_rasterizez(tris);
          rasterize(tris, attrib);
      }
  }
```

Figure 20:
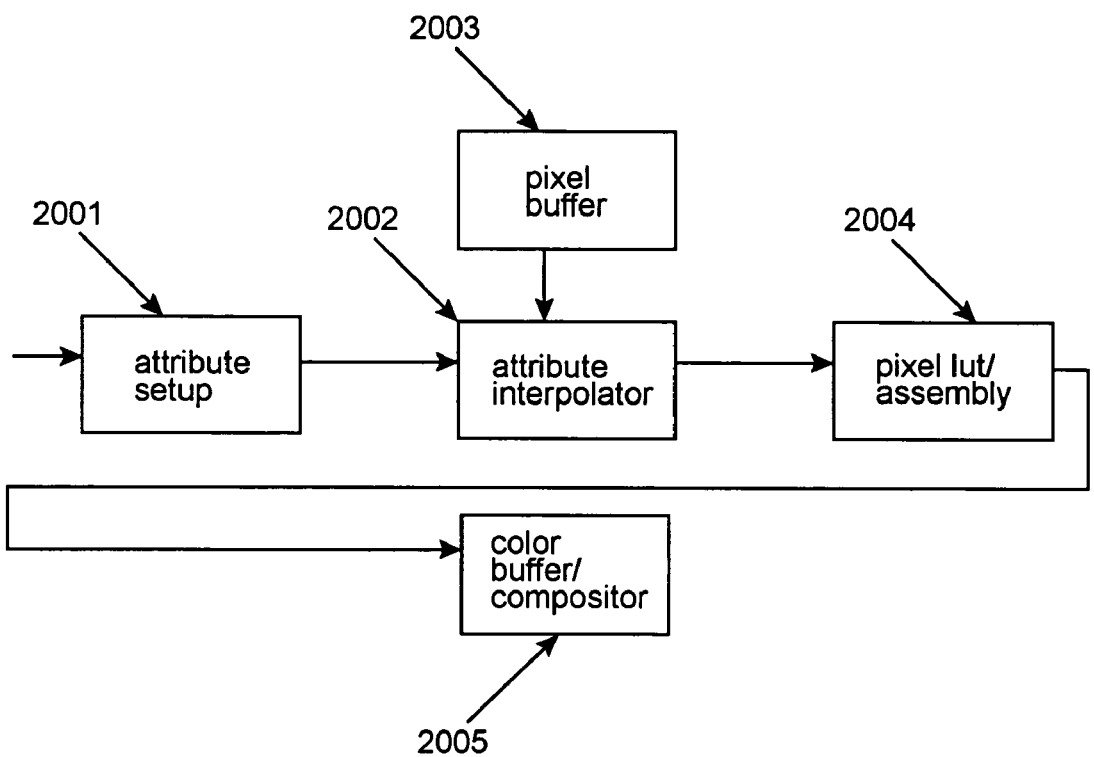
FIG. 20 is a block schematic diagram of the data flow of a coarse-grain multipass rendering engine in a preferred embodiment of the invention.

With respect to FIG. 20, the coarse-grain multipass algorithm contains an attribute setup module 2001. An attribute interpolator 2002, accesses the pixel buffer 2003. Output is sent to the pixel lut/assembly 2004, which passes information to the color buffer/blender 2005.

Each of the above programming paradigms has its advantages and disadvantages. In the case of fine-grained multipass algorithms, it is only necessary to scan convert and rasterize z once per triangle, and then iterate over all triangle parameters. The flip side however is the potentially substantial penalty of frequent switching (on a per-triangle basis) from one attribute to another attribute during certain stages of the pipeline, specifically, the pixel look-up and assembly stage (e.g. for texturing) and the color composition stage for multipass colors. While it is possible to use hardware replication to get good performance, this solution does not scale very well. Another potential problem is that a separate color compositor to composite colors derived from different attributes may be needed. The compositor, however, may exhibit substantially similar functionalities to the color blender of the final tile color buffer. This causes concerns of redundant hardware. While in theory the color compositor can be merged with the color blender of the tile color buffer, this might be difficult to do in practice because the data flow of these two units will be sufficiently different.

For coarse-grained multipass algorithms, we have to scan convert and rasterize z multiple times for each triangle. In addition, processing bandwidth is needed to send the triangles and their attributes multiple times. One feature is that there is low likelihood of any type of resource thrashing because switching of attributes is reduced. Therefore, only a single copy of a resource at any stage of the pipeline is needed. Another advantage is that a separate color compositor is not needed. The multipass color composition is performed using the color blender and the incoming pixel colors are always blended with the existing pixel colors in the tile color buffer. One concern with this approach however is how to handle multipass blended colors of partial fragments in a consistent fashion if the brute-force supersampling is not done. Another tricky issue is handling multipass blended colors of coincident pixels (pixels with same z's) in a consistent fashion may not be feasible.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. An integrated circuit comprising:
a memory interface to read data from and write data to an external memory;
a scan/z engine coupled to the memory interface, wherein the scan/z engine receives vertex coordinates and determines visible fragments in screen-space tiles;
a rasterizer coupled to receive visible fragments from the scan/z engine, wherein the rasterizer rasterizes fragments in screen-space tiles; and
a shader coupled to the rasterizer,
wherein when the scan/z engine is determining visible fragments in a first screen-space tile, the rasterizer rasterizes fragments in a second screen-space tile.

2. The integrated circuit of claim 1 wherein the scan/z engine performs a double-z scan.

3. The integrated circuit of claim 2 wherein the double-z scan comprises:
performing first and second functions to determine visibility information from a first plurality of primitives, the first function comprising:
receiving the first plurality of primitives including a plurality of vertices and vertices connectivity information, each vertex including x, y, and z coordinates;
scan converting the first plurality of primitives to determine z values for each x and y location in a screen-space tile;
comparing z values for each primitive in the first plurality of primitives at each x and y location; and
storing a z value for each x and y location; and
performing the second function, the second function comprising:
receiving the first plurality of primitives including a plurality of vertices and vertices connectivity information, each vertex including x, y, and z coordinates;
scan converting the first plurality of primitives to determine z values for each x and y location in the screen-space tile; and
comparing the determined z values to the stored z value at each x and y location.

4. The integrated circuit of claim 3 wherein the each of the first plurality of primitives are opaque.

5. The integrated circuit of claim 4 wherein the double-z scan further comprises:
receiving a second plurality of primitives, where the second plurality of primitives are transparent;
scan-converting the second plurality of primitives to determine z values for each x and y location in the screen-space tile; and
comparing the determined z values to the stored z value at each x and y location.

6. The integrated circuit of claim 3 further comprising a first-in first-out memory coupled between the scan/z engine and the rasterizer.

7. The integrated circuit of claim 3 wherein the memory interface is further configured to access a plurality of memory locations addressable using a plurality of memory addresses to form a first-in first-out memory coupled between the scan/z engine and the rasterizer.

8. The integrated circuit of claim 3 wherein the memory interface is configured to receive screen x, y, and z coordinates from a first plurality of memory locations addressable using a first plurality of memory addresses and to provide the screen x, y, and z coordinates to the scan/z engine, and the memory interface is further configured to receive surface parameters from a second plurality of memory locations addressable using a second plurality of memory addresses and to provide the surface parameters to the rasterizer.

9. The integrated circuit of claim 8 wherein the surface parameters comprise parameters other than x, y, and z coordinates.

10. The integrated circuit of claim 9 wherein the memory interface is further configured to receive textures from a third plurality of memory locations addressable using a third plurality of memory addresses and to provide the textures to the shader.

11. The integrated circuit of claim 10 wherein the shader is coupled to a blender.

12. An integrated circuit comprising:
a scan/z engine, wherein the scan/z engine receives vertex coordinates and determines visible fragments;
a rasterizer coupled to receive visible fragments from the scan/z engine, wherein the rasterizer rasterizes fragments;
a shader coupled to the rasterizer; and
a memory coupled to the rasterizer and shader, wherein the memory stores frame buffer data for a plurality of pixels while the rasterizer rasterizes fragments for the plurality of pixels.

13. The integrated circuit of claim 12 wherein the scan/z engine determines visible fragments in screen-space tiles and the rasterizer rasterizes fragments in the screen-space tiles.

14. The integrated circuit of claim 13 wherein the memory stores frame buffer data for a screen-space tile while the rasterizer rasterizes fragments in the screen-space tile.

15. The integrated circuit of claim 11 wherein the plurality of pixels comprises a screen-space tile.

16. An integrated circuit comprising:
a memory interface coupled to receive vertex x, y, and z coordinates without receiving surface parameters from a first plurality of memory locations addressable using a first plurality of addresses, and further coupled to receive surface parameters from a second plurality of memory locations addressable using a second plurality of addresses;
a scan/z engine coupled to receive the vertex x, y, and z coordinates from the memory interface, wherein the scan/z engine determines visibility information; and
a rasterizer coupled to the scan/z engine and coupled to receive the surface parameters from the memory interface and visible fragments from the scan/z engine.

17. The integrated circuit of claim 16 wherein the scan/z engine determines visibility information by:
performing first and second functions on a plurality of primitives, the first function comprising:
receiving the plurality of primitives including a plurality of vertices and vertices connectivity information, each vertex including x, y, and z coordinates;
scan converting the plurality of primitives to determine z values for each x and y location in a screen-space tile;
comparing z values for each primitive in the plurality of primitives at each x and y location; and
storing a z value for each x and y location; and
performing the second function, the second function comprising:
receiving the plurality of primitives including a plurality of vertices and vertices connectivity information, each vertex including x, y, and z coordinates;
scan converting the plurality of primitives to determine z values for each x and y location in the screen-space tile; and
comparing the determined z values to the stored z value at each x and y location.

18. The integrated circuit of claim 16 wherein the surface parameters comprise parameters other than x, y, and z coordinates.

19. The integrated circuit of claim 18 wherein the x, y, and z coordinates comprise a portion of a screen x, y, and z stream, and the screen x, y, and z steam further includes mode information related to scan conversion and depth operations.

20. The integrated circuit of claim 19 wherein screen x, y, and z coordinates are added to the visibility information determined by the scan/z engine.

* * * * *